United States Patent
Parkvall et al.

(10) Patent No.: US 10,912,063 B2
(45) Date of Patent: Feb. 2, 2021

(54) RADIO NODE, WIRELESS DEVICE AND METHODS FOR CARRIER AGGREGATION CONTROL INFORMATION

(71) Applicant: Telefonaktiebolaget LM Ericsson (publ), Stockholm (SE)

(72) Inventors: Stefan Parkvall, Bromma (SE); Jung-Fu Cheng, Fremont, CA (US); Christian Hoymann, Aachen (DE); Daniel Larsson, Stockholm (SE); Magnus Stattin, Upplands Väsby (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 15/510,079

(22) PCT Filed: Sep. 14, 2015

(86) PCT No.: PCT/SE2015/050960
§ 371 (c)(1),
(2) Date: Mar. 9, 2017

(87) PCT Pub. No.: WO2016/039684
PCT Pub. Date: Mar. 17, 2016

(65) Prior Publication Data
US 2017/0251461 A1     Aug. 31, 2017

Related U.S. Application Data

(60) Provisional application No. 62/049,908, filed on Sep. 12, 2014.

(51) Int. Cl.
*H04W 72/04*   (2009.01)
*H04L 5/00*    (2006.01)
(Continued)

(52) U.S. Cl.
CPC ......... *H04W 72/0406* (2013.01); *H04L 5/001* (2013.01); *H04L 5/0053* (2013.01);
(Continued)

(58) Field of Classification Search
CPC ......... H04L 1/0029; H04L 5/00; H04L 5/001; H04L 5/003; H04L 5/0048; H04L 5/0053;
(Continued)

(56) References Cited

U.S. PATENT DOCUMENTS

2010/0322175 A1   12/2010   Chen
2011/0070845 A1   3/2011    Chen et al.
(Continued)

FOREIGN PATENT DOCUMENTS

EP   2424138 A2   2/2012
EP   2538716 A1   12/2012
(Continued)

*Primary Examiner* — Harun Chowdhury
(74) *Attorney, Agent, or Firm* — Coats + Bennett, PLLC

(57) ABSTRACT

The present invention relates to a radio node (212), a wireless device (220) and methods performed by the radio node (212) and the wireless device (220) for communicating in a wireless communication system (200). The wireless device (220) is configured with cells on at least two component carriers, CCs, available to the wireless communication system (200) for communication with the wireless device (220). Each one of the at least two CCs is associated with at least one CC group out of a set of CC groups. The radio node (212) transmits control information to the wireless device (220)indicating a CC group. The transmitted control information applies to at least one CC, which at least one CC is at least one of those CCs, out of the at least two CCs, that are associated with the indicated CC group. The wireless device (220) receives the control information from the radio node (212) and applies the received control information to at least one CC, which at least one CC is at least one of those CCs, out of the at least two CCs, that are associated with the indicated CC group.

52 Claims, 12 Drawing Sheets

(51) Int. Cl.
*H04W 72/12* (2009.01)
*H04L 1/18* (2006.01)

(52) U.S. Cl.
CPC ....... *H04W 72/1289* (2013.01); *H04L 1/1861* (2013.01); *H04L 5/0051* (2013.01); *H04L 5/0092* (2013.01)

(58) Field of Classification Search
CPC ... H04L 5/0091; H04L 5/0094; H04L 5/0092; H04W 72/0406; H04W 72/1289
USPC .......................... 370/254, 328, 329, 252, 280
See application file for complete search history.

(56) References Cited

U.S. PATENT DOCUMENTS

2011/0310818 A1* 12/2011 Lin ....................... H04L 5/0048
370/329
2012/0051306 A1* 3/2012 Chung .................... H04L 5/001
370/329
2012/0057487 A1 3/2012 Ahn et al.
2012/0082145 A1* 4/2012 Chen ..................... H04L 1/0029
370/338
2012/0207059 A1* 8/2012 Lin ......................... H04L 5/003
370/254
2012/0243498 A1* 9/2012 Kwon ....................... H04L 5/00
370/329
2012/0275395 A1 11/2012 Gerstenberger et al.
2013/0121301 A1* 5/2013 Kim ...................... H04L 5/0053
370/329
2015/0103703 A1* 4/2015 Zeng ....................... H04L 5/001
370/280

FOREIGN PATENT DOCUMENTS

| RU | 2012114092 A | 10/2013 |
| WO | 2010048178 A1 | 4/2010 |
| WO | 2016011228 A1 | 1/2016 |

* cited by examiner

| 320 Component carrier group number | 310 Set of physical component carriers |
|---|---|
| 0 | 0 |
| 1 | 1 |
| 2 | 0, 1 |
| 3 | 0, 1, 2, 3 |
| 4 | 0, 1, 3, 4, 4, 5, 6, 7 |
| 5 | ... |
| 6 | ... |
| 7 | ... |

Fig. 3

RADIO NODE, WIRELESS DEVICE AND METHODS FOR CARRIER AGGREGATION CONTROL INFORMATION

TECHNICAL FIELD

Embodiments herein relate to a radio node, a wireless device and methods performed therein. In particular embodiments herein relate to communication between the radio node and the wireless device in a wireless communication system using Carrier Aggregation (CA).

BACKGROUND

In a typical wireless communications network, communication terminals, also known as wireless devices and/or user equipments (UEs), communicate via a Radio Access Network (RAN) to one or more core networks. The RAN covers a geographical area which is divided into cell areas, with each cell area being served by a radio access node such as a base station, e.g., a radio base station (RBS), which in some networks may also be called, for example, a "NodeB" or "eNodeB". A cell is a geographical area where radio coverage is provided by the radio base station at a base station site or an antenna site in case the antenna and the radio base station are not col-located. Each cell is identified by an identity within the local radio area, which is broadcast in the cell. Another identity identifying the cell uniquely in the whole wireless communication network is also broadcasted in the cell. One radio access node may have one or more cells. The radio access nodes communicate over the air interface operating on radio frequencies with the communication terminals within range of the radio access nodes.

A Universal Mobile Telecommunications System (UMTS) is a third generation wireless communication system, which evolved from the second generation (2G) Global System for Mobile Communications (GSM). The UMTS Terrestrial Radio Access Network (UTRAN) is essentially a RAN using Wideband Code Division Multiple Access (WCDMA) and/or High Speed Packet Access (HSPA) for wireless devices. In a forum known as the Third Generation Partnership Project (3GPP), telecommunications suppliers propose and agree upon standards for third generation networks and UTRAN specifically, and investigate enhanced data rate and radio capacity. In some versions of the RAN as e.g. in UMTS, several radio access nodes may be connected, e.g., by landlines or microwave, to a controller node, such as a radio network controller (RNC) or a base station controller (BSC), which supervises and coordinates various activities of the plural base stations connected thereto. The RNCs are typically connected to one or more core networks.

Specifications for the Evolved Packet System (EPS) have been completed within the 3GPP and this work continues in the coming 3GPP releases. The EPS comprises the Evolved Universal Terrestrial Radio Access Network (E-UTRAN), also known as the Long Term Evolution (LTE) radio access, and the Evolved Packet Core (EPC), also known as System Architecture Evolution (SAE) core network. E-UTRAN/LTE is a variant of a 3GPP radio access technology wherein the radio access nodes are directly connected to the EPC core network rather than to RNCs. In general, in E-UTRAN/LTE the functions of a RNC are distributed between the radio access nodes, e.g. eNodeBs in LTE, and the core network. As such, the Radio Access Network (RAN) of an EPS has an essentially "flat" architecture comprising radio access nodes that do not report to RNCs.

The possibility for carrier aggregation was introduced in LTE release 10. In the case of carrier aggregation, multiple LTE carriers, each with a bandwidth up to 20 MHz, can be transmitted in parallel to/from the same terminal, thereby allowing for an overall wider bandwidth and correspondingly higher per-link data rates. In the context of carrier aggregation, each carrier is referred to as a component carrier or, as may be the case in the specifications, each component carrier may be referred to as a cell. In LTE, a UE first connects to the network with a serving cell, which becomes the primary cell (PCell), also denote Primary serving Cell, for the UE, which continues to handle the mobility and Radio Resource Control (RRC) connection of the UE. The additional aggregated cells are referred to as the secondary cells (SCells) or Secondary serving Cell.

Up to five component carriers, possibly of different bandwidths up to 20 MHz in the Rel-10 LTE design, can be aggregated allowing for overall transmission bandwidths up to 100 MHz. A terminal capable of carrier aggregation may receive or transmit simultaneously on multiple component carriers. There is one primary carrier, i.e. primary component carrier, and up to four secondary component carriers.

All data transmissions in LTE are scheduled. Downlink Control Information (DCI) transmitted from the eNodeB on the (E)PDCCH, i.e. on the Physical Downlink Control Channel (PDCCH) or on the enhanced Physical Control Channel (ePDCCH), provides the terminal with information necessary to receive downlink data transmission on the Physical Downlink Shared Channel (PDSCH) as well as, in a similar manner, for uplink data transmission on the Physical Uplink Shared Channel (PUSCH). LTE Uplink (UL) and Downlink (DL) carrier bandwidths are divided into resource blocks and DCI comprises resource block assignment indicating on which resource blocks of the UL or DL carrier transmission should be performed. In response to downlink data transmission, the terminal transmits one or several Acknowledgements/Non-acknowledgments (ACK/NAKs) in the uplink on Physical Uplink Control Channel (PUCCH) to indicate to the eNodeB whether the data was successfully received or not. Similarly, the eNodeB can request retransmission of incorrectly received data through the Physical Hybrid-Automatic Repeat Request Indicator Channel (PHICH).

A terminal supporting multiple component carriers needs to know to which component carrier a certain DCI relates. This information can either be implicit or explicit, depending on whether cross-carrier scheduling is used or not, as illustrated in FIG. 1. Enabling cross-carrier scheduling is done individually via RRC signaling on a per-terminal and per-component-carrier basis.

In the absence of cross-carrier scheduling, downlink scheduling assignments are valid for the component carrier upon which they are transmitted. Similarly, for uplink grants, there is an association between downlink and uplink component carriers such that each uplink component carrier has an associated downlink component carrier.

In the presence of cross-carrier scheduling, where data is transmitted on a component carrier other than the component carrier that the DCI is transmitted upon, the carrier indicator field (CIF) in the DCI provides information about the component carrier used for the data transmission. The component carrier that the DCI is transmitted upon may be associated component carrier, being associated with the component carrier used for the data transmission. In the LTE protocol, the CIF is represented by a 3-bit numeral in the DCI. The CIF can hence support cross-carrier scheduling indication of up to eight total serving cells, the PCell and up to seven SCells. However, the Rel-10 LTE specifications limit the possible values of the CIF to be no more than four.

Whether cross-carrier scheduling is used or not is configured using higher-layer signaling; if cross-carrier scheduling is not configured then no carrier indication field is included in the DCI. Thus, most of the DCI formats come in two "flavors" or variants, with and without the carrier indication field, and which "flavor" or variant the terminal is supposed to monitor is determined by enabling/disabling support for cross-carrier scheduling.

To signal which component carrier a grant relates to, the component carriers are numbered. The primary component carrier is always given the number zero, while the different secondary component carriers are assigned a unique number each through terminal-specific RRC signaling. Hence, even if the terminal and the eNodeB may have different understandings of the component carrier numbering during a brief period of reconfiguration, at least transmissions on the primary component carrier can be scheduled.

Uplink control information in the form of ACK/NAKs is always transmitted on the primary component carrier (PCell), irrespective of the downlink component carrier used for the downlink data transmission.

Carrier aggregation in LTE is limited to five component carriers, i.e. at most 100 MHz of bandwidth can be used for data transmission. To support even larger spectrum allocations, changes are needed.

SUMMARY

It is therefore an object of the present invention to provide a mechanism for enabling more flexibility in communication between radio nodes and wireless devices in a wireless communications system. A further object is to increase the bandwidth available for spectrum allocations, i.e. the bandwidth possible to use, in a wireless communications system employing CA.

According to a first aspect of the present invention, the object is achieved by a method performed by a radio node for communicating with a wireless device in a wireless communication system. The wireless device is configured with cells on at least two component carriers (CCs), available to the wireless communication system for communication with the wireless device. According to the method, the radio node associates each one of the at least two CCs with at least one Component Carrier (CC) group out of a set of CC groups and transmits control information to the wireless device indicating a CC group. The transmitted control information applies to at least one CC, which at least one CC is at least one of those CCs, out of the at least two CCs, that are associated with the indicated CC group.

According to a second aspect of the present invention, the object is achieved by a method performed by a wireless device for communicating with a radio node in a wireless communication system. The wireless device is configured with cells on at least two CCs available to the wireless communication system for communication with the wireless device. According to the method, the wireless device obtains information on an association of each one of the at least two CCs with at least one CC group out of a set of CC groups. The wireless device further receives control information from the radio node indicating a CC group and applies the received control information to at least one CC. The at least one CC is at least one of those CCs, out of the at least two CCs, that are associated with the indicated CC group.

According to a third aspect of the present invention, the object is achieved by a radio node for communicating with a wireless device that has been configured with cells on at least two component carriers, CCs, in a wireless communication system. The at least two CCs are available to the wireless communication system for communication with the wireless device. The radio node is adapted to associate each one of the at least two CCs with at least one CC group out of a set of CC groups and to transmit control information to the wireless device indicating a CC group. The transmitted control information applies to at least one CC, which at least one CC is at least one of those CCs, out of the at least two CCs, that are associated with the indicated CC group.

According to a fourth aspect of the present invention, the object is achieved by a wireless device for communicating with a radio node in a wireless communication system. The wireless device is configurable with cells on at least two CCs available to the wireless communication system for communication with the wireless device. The wireless device is adapted to obtain information on an association of each one of the at least two CCs with at least one CC group out of a set of CC groups. The wireless device is further adapted to receive control information from the radio node indicating a CC group and to apply the received control information to at least one CC. The at least one CC is at least one of those CCs, out of the at least two CCs, that are associated with the indicated CC group.

Introducing the concept component carrier groups and letting transmitted control information refer to a component carrier group such that the transmitted control information is applied to one or more component carriers being part of that component carrier group allows for enabling more flexibility in communication between radio nodes and wireless devices in that it enables increase of the available bandwidth for spectrum allocations without requiring re-design of the basic framework, such as the numerology or control signalling of the wireless communications system. The above stated objects are thereby achieved.

BRIEF DESCRIPTION OF THE DRAWINGS

FIG. 3 is an example illustrating a set of component carrier groups according to embodiments herein.

DETAILED DESCRIPTION

Figure 1:
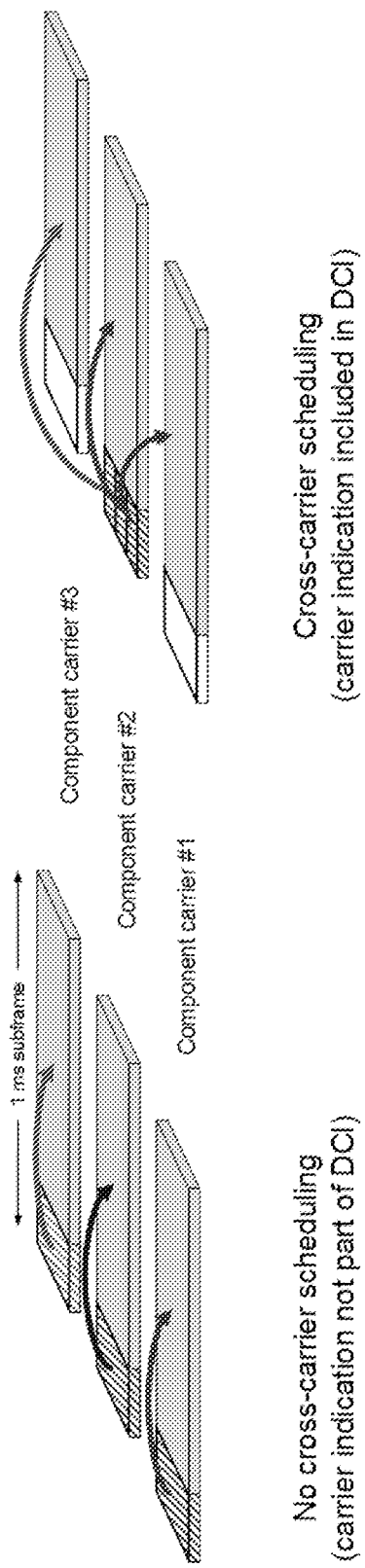
FIG. 1 is a schematic block diagram illustrating different types of scheduling on a set of component carriers in a wireless communication system.
Figure 2:
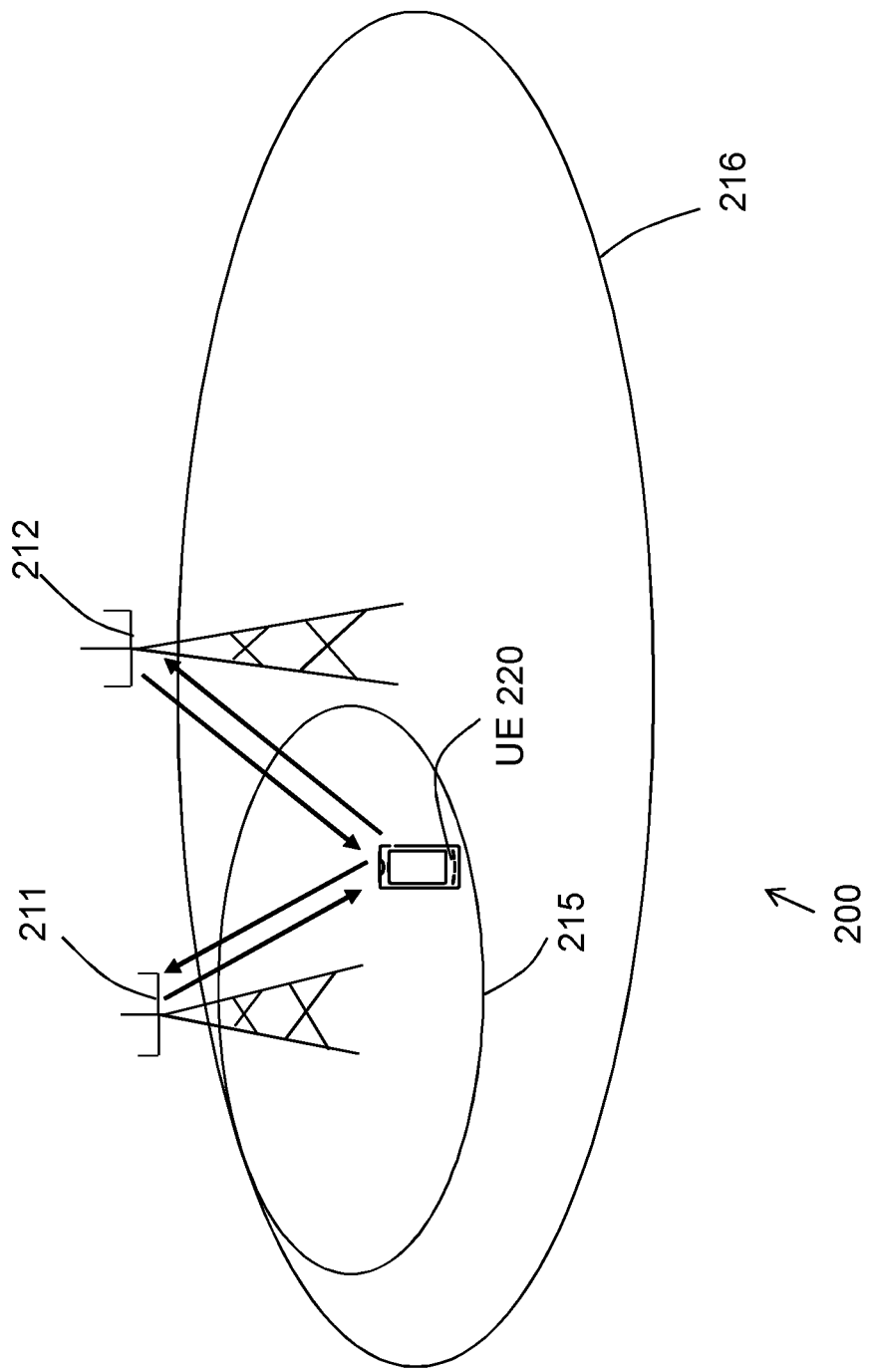
FIG. 2 is a schematic block diagram illustrating a scenario in a wireless communication system.

Embodiments herein relate to wireless communication networks in general. FIG. 2 is a schematic overview depicting a wireless communication system or network 200. The wireless communication network 200 comprises one or more RANs and one or more core networks (CNs) (not shown). The wireless communication network 200 may use a number of different technologies, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. The wireless communication network 200 is exemplified herein as an LTE network.

In the wireless communication network 200, a wireless device 220, also known as a communication terminal, a user equipment and/or a wireless terminal, communicates via a Radio Access Network (RAN) to one or more core networks (CN). It should be understood by the ones skilled in the art that "wireless device" is a non-limiting term which means any wireless terminal, user equipment, Machine Type Communication (MTC) device, a Device to Device (D2D) terminal, or node e.g. smartphone, laptop, mobile, sensor, relay, mobile tablets or even a small base station communicating within a cell.

Communication terminals connect in the licensed spectrum, to a first cell 216 e.g. a Primary Cell (PCell), and may use carrier aggregation to benefit from additional transmission capacity in licensed or unlicensed spectrum, connect to a second cell 215 e.g. a Secondary Cell (SCell) also referred to as Licensed Assisted (LA) SCell when in unlicensed frequency spectrum.

The wireless communication network 200 covers a geographical area which is divided into cell areas, e.g. the first cell 216 and the second cell 215. The first cell 216 is served by a first radio node 212 providing radio coverage over the first cell 216. The second cell 215 is served by a second radio node 211. The radio nodes or radio access nodes may be radio base stations such as NodeBs, an evolved Node Bs (eNB, eNode B), base transceiver stations, Access Point Base Stations, base station routers, remote radio units, or any other network units capable of communicating with a wireless device within the cell served by the respective radio node depending e.g. on the radio access technology and terminology used. The radio nodes may serve one or more cells. A cell is a geographical area where radio coverage is provided by radio base station equipment at a base station site or at remote locations in Remote Radio Units (RRU). The cell definition may also incorporate frequency bands and radio access technology used for transmissions, which means that two different cells may cover the same geographical area but use different frequency bands.

The radio nodes communicate over the air or radio interface operating on radio frequencies with the wireless device 220 within range of the respective radio node. The wireless device 220 transmits data over the radio interface to the respective radio node 211, 212 in Uplink (UL) transmissions and the respective radio node 211, 212 transmits data over an air or radio interface to the wireless device 220 in Downlink (DL) transmissions.

The second radio node 211 serving the second cell 215 may in some embodiments use a carrier of an unlicensed frequency spectrum, which unlicensed frequency spectrum may also be used by an access point such as a WiFi modem, a hotspot or similar, whereas in other embodiments described herein the second radio node 211 serving the second cell 215 uses a carrier of a licensed frequency spectrum.

Although the LTE structure could be updated to support more than five component carriers, the structure does not scale very well for large number of component carriers. For example, downlink and uplink control signaling structures need to be changed. e.g. by increasing the size of the carrier indicator field in the DCI and increasing the number of ACK/NAKs that can be transmitted on the primary component carrier.

Another possibility is to extend each component carrier to support more than 20 MHz. This would imply significant redesigns of the current LTE structure and is therefore less attractive.

The proposed solution introduces the concept of virtual component carriers or component carrier groups to address spectrum allocations larger than 100 MHz without redesigning the LTE numerology or the control signaling. According to the introduced concept, downlink control signaling may refer to one component carrier group. The control information may be applied to one or more, or all, component carriers being part of that component carrier group. Furthermore, uplink ACK/NAKs may refer to component carrier groups, and if reception of data on one or more component carriers in a component carrier group has failed a not acknowledged (NAK) may be transmitted, otherwise an acknowledged (ACK). This enables bandwidths larger than 100 MHz to be utilized with minimal changes to the current LTE framework.

To increase the available bandwidth, an extension of the carrier indicator field (CIF) to allow values higher than four to be valid in the LTE protocol to enable addressing of more serving Scells is one possibility. This solution would allow support of up to eight serving cells. When a wireless device is configured with eight serving cells, one cell will be the PCell and seven cells will be SCells, numbered from 0 to 7 starting from the PCell. However, in the current LTE protocol, the PCell can never be cross-carrier scheduled by another serving cell. Therefore, the CIF can never take a zero value.

In a first embodiment, according to a first teaching of this disclosure, nine serving cells, being the PCell and up to eight SCells, can be supported by defining CIF=0 as indexing to the 8th SCell. With this embodiment, a wireless device such as an LTE UE will be able to access a total 180 MHz of spectrum. This could further be extended with that the scheduling on the PCell is performed without CIF, enabling individual addressing of in total 9 cells.

Figure 4:
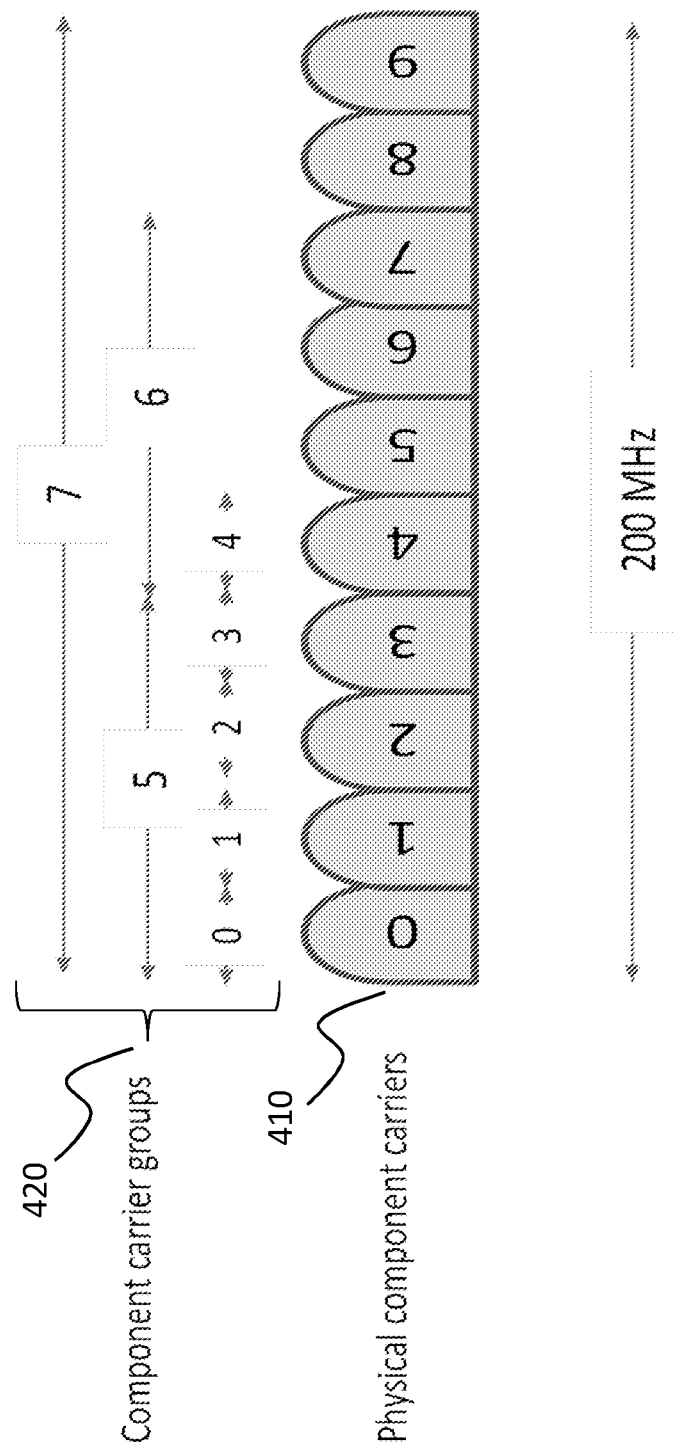
FIG. 4 is an example illustrating a set of component carrier groups according to embodiments herein.

According to a second embodiment one or more component carrier groups are defined, either as part of the specifications or through higher layer signaling. One example of a set of component carrier groups are provided in the table shown in FIG. 3, another one in FIG. 4. In FIG. 3 each component carrier (CC) group number 320 corresponds to a respective set of physical component carriers (CCs) 310. In FIG. 4, physical component carriers (CCs) 410, numbered 0-9 in FIG. 4, are associated with at least one component carrier (CC) group out of a set 420 of component carrier (CC) groups, numbered 0-7 in FIG. 4. In this example, CC groups 0, 1, 2, 3 and 4 each comprise one physical component carrier (CC), numbered 0, 1, 2, 3 and 4 respectively, whereas CC groups 5, 6 and 7 each comprises more than one physical component carrier 410: CC group 5 comprises physical component carriers 0, 1, 2, 3; CC group 6 comprises physical component carriers 4, 5, 6, 7; and CC group 7 comprises physical component carriers 0, 1, 2, 3, 4, 5, 6, 7, 8, 9, thereby spanning the whole bandwidth of 200 MHz covered by the physical component carriers 410.

The carrier indicator field in the DCI now refers to the component carrier group. By using a relation such as that in the table in FIG. 3 or in FIG. 4, the terminal, i.e. the wireless device, can determine which component carriers to receive data upon, or transmit data upon.

In the uplink for the case when data is received by the wireless device, or downlink, for the case when data is transmitted by the wireless device, the decoding result from each component carrier in a component carrier group is combined into one bit per component carrier and transport block. One example of a preferred combining rule is to report ACK if decoding (on one spatial layer in case of spatial multiplexing) was successful on all component carriers in the component carrier group and NAK otherwise.

The structure described above implies that the same control information in terms of e.g. scheduled resource blocks is applied to all component carriers within a component carrier group. This is not seen as a major problem since a component carrier group with multiple component carriers is primarily used to achieve very large transmission bandwidths in which case all the resource blocks on all the component carriers in the group are used anyway.

The relation between component carrier and component carrier groups, exemplified by the table in FIG. 3, may either be predefined in the specifications or (preferably) configured using higher-layer signaling. With a carrier indicator field in the DCI consisting of three bits, up to eight component carrier groups could be defined, giving some additional flexibility in the usage of different component carriers.

Another possibility to extend the number of addressable component carriers without changing the DCI is to introduce restrictions on which component carriers DCI on a specific component carrier refers to. For example, the carrier indicator field in a DCI transmitted on component carrier 0 could refer to data transmission on component carriers 0-4, or 0-7 if eight values of the 3-bit DCI field are used, whereas the carrier indicator field in a DCI transmitted on component carrier 1 could refer to data transmission on component carriers 5-9 (or 8-15 if eight values of the 3-bit DCI field are used, and so on. In essence, the component carrier number used for data transmission is not directly signaled as part of the DCI but is obtained as Component_Carrier_Number=f(Carrier_Indicator_Field, Component_Carrier_upon_which_the_DCI_was_transmitted)

This principle could easily be combined with the component carrier groups in the second embodiment, in which case the corresponding expression would be Component_Carrier_Group_Number=f(Carrier_Indicator_Field, Component_Carrier_upon_which_the_DCI_was_transmitted).

One non-limiting embodiment of the above teaching is to configure a carrier index offset for a configured scheduling serving SCell, i.e. an SCell that is configured to schedule transmissions on other cells. i.e. to perform cross-carrier scheduling. The true carrier index to be addressed is the sum of the carrier index offset and the carrier indicator field sent in the DCI. The configuration is performed via higher layer signalling, e.g., the radio resource control (RRC) signaling. The default value of the carrier index offset is 0 if such offset is not signaled by the higher layer. For the PCell, the carrier index offset can also be set by default to be 0.

As a nonlimiting exemplary implementation to illustrate the teaching, a wireless device, such as a UE, is configured with a PCell and an SCell #1 in the licensed band and 8 additional SCells, with indices from #2 to #9, in the unlicensed band. The SCell #1 is configured as a scheduling serving cell with a carrier index offset of 5. With this configuration, the DCI sent from the PCell can address SCell #2 to #5 by using CIF values of 2 to 5 and the DCI sent from the SCell #1 can address SCell #6 to #9 by using CIF values of 1 to 4. In this example, an LTE UE will be able to access a total 200 MHz of spectrum.

As a further illustration, a wireless device, such as a UE, is configured with a PCell and 15 SCells. SCell #8 is configured as a scheduling serving cell with a carrier index offset of 8. Wth this configuration, the DCI sent from the PCell can address SCell #1 to #7 by using CIF values of 1 to 7 and the SCell #8 can address SCell #9 to #15 by using CIF values of 1 to 7. In this example, an LTE UE will be able to access a total 320 MHz of spectrum.

An additional embodiment to improve the above teaching is to introduce the feature that an SCell configured with carrier index offset can be additionally configured as a serving cell on which the wireless device or UE can send Uplink control information in the form of ACK/NAKs. This embodiment can alleviate the uplink control signal load on the PCell. This can be particularly helpful if such an SCell is on a carrier frequency much different than that of the PCell such that transmissions on the SCell and the PCell are transmitted on different transmitters. This can also be configured when the PCell is from a farther away macro cell site while the SCell is from a close-by small cell site.

In another example the component carrier group could be used in the configuration of aperiodic Channel Status Information (CSI) reporting or trigger based (Sounding Reference Signal) SRS reporting. An aperiodic CSI report is triggered by a bit field in a DCI message. The bit field associated with aperiodic CSI reporting may contain 2 bits, wherein one bit combination indicates no aperiodic CSI reporting and wherein the other three remaining bit combinations may be used for indicating an aperiodic CSI report for a component carrier group or multiple groups of component carriers, according to the proposed teaching herein. The component carrier group or groups that are associated with a certain bit field or bit combination could be configured through RRC signaling for one or multiple of the bit combinations. The same mechanism can also be extended to aperiodic SRS reporting, i.e. type 2 SRS reports, wherein a certain SRS trigger according to the proposed teaching herein indicates that SRS should be transmitted within a certain carrier group.

In one embodiment the resource assignment, or resource block assignment of the DCI would apply equally to all carriers of a component carrier group. This means that the same Resource Block (RB) numbers are used on all CC. Example: DCI indicates that the data is on RBs 10-80. In this embodiment, RB 10-80 on CC #1 would be used, RB 10-80 on CC #2, etc In another embodiment the resource assignment, e.g. the resource block assignment, is to be scaled to span the full bandwidth of the component carrier group or for some embodiments, to span the bandwidth of the one or more carrier(s), i.e. the one or more CCs, of the component carrier group to which the resource assignment or resource block assignment applies. For example, if the resource assignment or resource block assignment comprises x bits per resource block, or per other unit, if applied for scheduling on one CC of a first bandwidth, and the resource assignment is to be applied to a CC group comprising two CCs having a total bandwidth that is twice the first bandwidth, then the resource block assignment would be scaled by half to x/2 bits per resource block or other unit. The idea here is to keep the number of bits for RB indication in the DCI but to lower the resolution. Example: Assume there are x bits to indicate RBs with a resolution of 1 RB on one CC. For two aggregated CCs of the same bandwidth, there is still x bits but it is now only possible to indicate pairs of RBs, i.e. a resolution of 2 RBs. Basically the RB allocation information is interpreted as being valid for the total bandwidth (BW) across all CCs. This means that in case of two CCs, one with 100 RB BW and one with 50 RB BW, the x bits will be interpreted in a space of 150 RB BW.

To limit and/or simplify inter-carrier scheduler dependency, in another embodiment the resource block assignment applies to one or more carrier(s) of the component carrier group and for other carriers of the same component carrier group, all or a pre-configured set of Physical Resource Blocks (PRBs) are assigned. The one or more carrier(s) to which the resource block assignment applies may be explicitly indicated, e.g., with the CIF, or pre-configured per component carrier group, e.g., using higher-layer signalling or rule in a specification. It may also be a function, e.g., pre-configured using higher-layer signalling or rule in a specification, of the carrier on which the DCI is signalled. A pre-configured set of PRBs assigned for other carriers may be determined, e.g., using higher-layer signalling or rule in a specification and may comprise resource blocks not needed for, e.g., System Information (SI) or paging or evolved Multimedia Broadcast Multicast Service (eMBMS) or some other prioritized use; i.e., the pre-configured set of PRBs may exclude resource blocks needed, e.g., for SI or paging or eMBMS or other prioritized use. A pre-configured set of PRBs may be selected from a set of pre-configured sets of PRBs and the selected set may be indicated, e.g., with a field in DCI.

In another embodiment the resource block assignment applies to one or more carrier(s), i.e. one or more CCs, of the component carrier group. The Physical Resource Block (PRB) assignment for other carriers, i.e. other CCs, of the same component carrier group may be provided with a second resource block assignment field, e.g. a second DCI.

The invention is defined as a method and an arrangement which may be put into practice in the embodiments described below.

In one embodiment, a method in a radio node for communicating with a user equipment, UE, in a wireless communication system is provided. The UE is configured with cells on at least two component carriers, CCs, out of a plurality of component carriers available to the radio node for communication with UEs. According to the method, the radio node defines a set of component carrier, CC, groups. Each CC group in said set of CC groups is identifiable by a respective CC group identity. The radio node associates each CC in the plurality of CCs with at least one CC group in said set of CC groups by assigning the respective CC group identity to the CC, whereby a particular CC group identity that identifies a particular CC group is assigned to the at least two CCs. The radio node then transmits control information to the UE indicating the particular CC group identity assigned to the at least two CCs. The transmitted control information is to be applied by the UE to each one of the at least two CCs.

Figure 5:
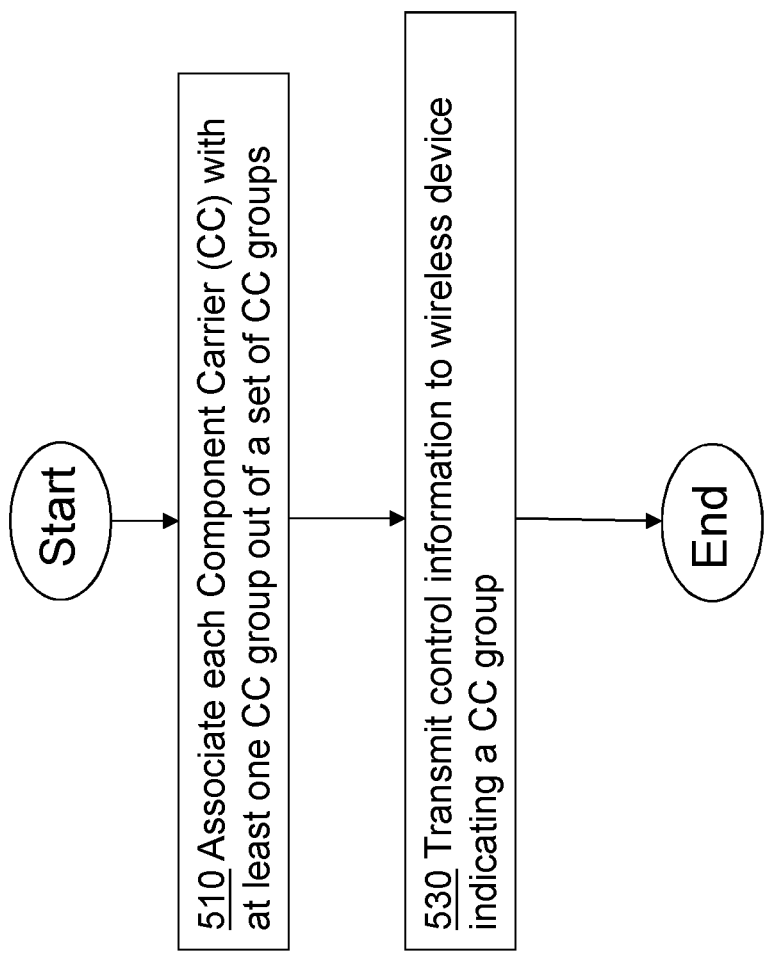
FIG. 5 is a flowchart of a method performed in a radio node according to embodiments herein.
Figure 6:
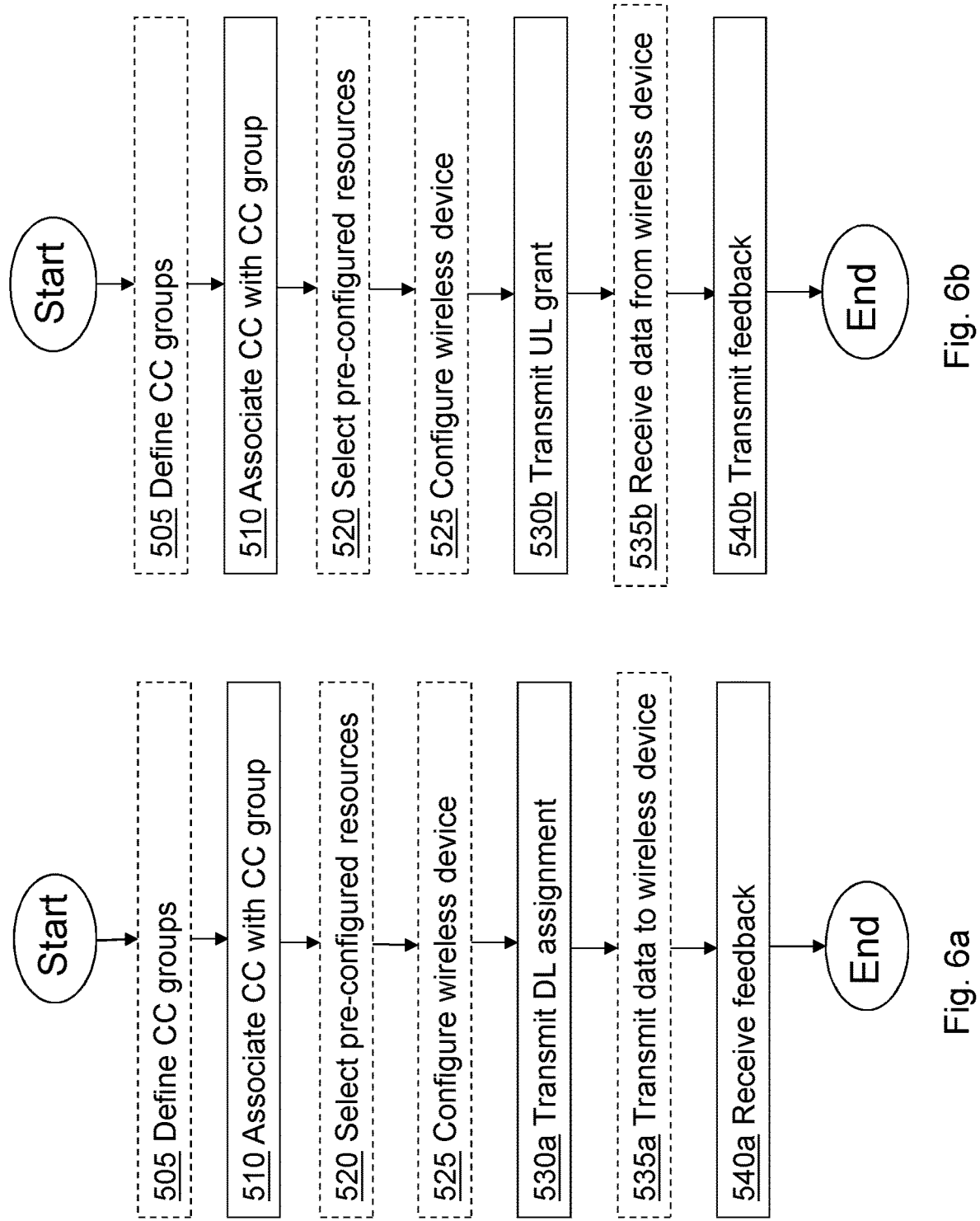
FIG. 6a is a flowchart of a method performed in a radio node according to embodiments herein.
FIG. 6b is a flowchart of a method performed in a radio node according to embodiments herein.

The method in the radio node 212 for communicating with a wireless device 220 in a wireless communication system 200 will now be described with reference to flow charts depicted in FIGS. 5, 6a and 6b. In FIG. 5 an illustration of the method in the radio node for a general case where the radio node transmits control information to the wireless device 220 is provided, whereas FIGS. 6a and 6b illustrate the method in more detail for more specific cases where the transmitted control information comprises scheduling information in form of a downlink (DL) assignment and an uplink (UL) grant respectively. The wireless device 220 is configured with cells on at least two component carriers (CCs) that are available to the wireless communication system 200 for communication with the wireless device 220. The at least two CCs may comprise a CC of a Primary Cell and a CC of a Secondary Cell of the wireless device 220. At least one of the at least two CCs may in some embodiments belong to an unlicensed frequency band.

The method comprises:

Action 510. The radio node 212 associates each one of the at least two CCs with at least one CC group out of a set of CC groups. The set of CC groups comprises one or more CC groups that may have been previously defined through higher layer signalling or in a specification for the wireless communication system. This is shown as an optional Action 505 in FIGS. 6a and 6b.

The radio node 212 may configure the wireless device 220 with a relation between the CC upon which the control information is transmitted and the indicated CC group. This is shown as an optional Action 525 in FIGS. 6a and 6b. The configuration in Action 525 may further comprise configuring the wireless device 220 with an index offset that depends on the CC upon which the control information is transmitted. The index offset may differ depending on whether the wireless device 220 is configured with the Primary Cell or the Secondary Cell on the CC upon which the control information is transmitted. The radio node 212 may further, depending on transmission direction of a corresponding data transmission, (to or from the wireless device), receive or transmit feedback information on a decoding result for the indicated CC group. The feedback information may be received or transmitted on the Primary Cell or the Secondary Cell of the wireless device 220 depending on whether the index offset, by which the indicated CC group or the at least one CC to which the transmitted control information applies is identifiable, is an index offset of the Primary Cell or an index offset of the Secondary Cell. In other words, the feedback information may be received or transmitted on the Primary Cell or the Secondary Cell of the wireless device 220 depending on whether the index offset is an index offset of the Primary Cell or an index offset of the Secondary Cell. In one example, the index offset is an index offset of the Primary Cell when the transmitted control information is transmitted on the Primary Cell and an index offset of the Secondary Cell when the transmitted control information is transmitted on the Secondary Cell. The index offset may be a CC group index offset or a CC index offset.

The radio node 212 may further in some embodiments select one or more pre-configured or pre-defined sets of scheduled resources from a set of pre-configured or pre-defined sets of resources for scheduling in an optional Action 520 shown in FIGS. 6a and 6b. The radio node 212 may then further configure the wireless device with one or more pre-configured or pre-defined sets of scheduled resources.

Action 530. The radio node 212 transmits control information to the wireless device 220 indicating a CC group. The transmitted control information applies to at least one CC. The at least one CC is at least one of those CCs, out of the at least two CCs, that are associated with the indicated CC group. The CC group may be at least partly indicated by selecting a CC upon which the control information is transmitted in dependence of the CC group to be indicated to the wireless device 220. For example, one CC group may be indicated when the CC upon which the control information is transmitted is the CC of the Primary Cell and another CC group may be indicated when the CC upon which the control information is transmitted is the CC of the Secondary Cell.

The radio node 212 may transmit the control information in a Downlink Control Information, DCI, message and the indicated CC group, or the at least one CC to which the transmitted control information applies, may be identifiable by applying the index offset to a value set by bits in an information field in the DCI message. As mentioned above under optional Action 525, the index offset depends on the CC upon which the control information is transmitted. The index offset may differ depending on whether the wireless device 220 is configured with the Primary Cell or the Secondary Cell on the CC upon which the control information is transmitted. The control information may in some embodiments comprise scheduling information, and the information field may be a Carrier Information Field, CIF, in the DCI message. In other embodiments the control information may comprise a trigger for aperiodic Channel Status Information, CSI, reporting and the information field may be a field associated with CSI reporting in the DCI message.

In further embodiments, the control information may comprise a trigger for Sounding Reference Signal, SRS, transmission. The trigger indicates that SRS should be transmitted on the at least one CC to which the transmitted control information applies.

The radio node 212 may in embodiments transmit the control information on a CC of a licensed frequency band so that the CC upon which the control information is transmitted is a CC of a licensed frequency band.

The radio node 212 may, in an embodiment where the control information comprises scheduling information in form of a downlink resource assignment that is to be applied by the wireless device to each one of the at least two CCs for identifying, on each one of the at least two CCs, respective sets of scheduled resources, perform the Action 530 as illustrated by Action 530a in FIG. 6a, where the radio node 212 transmits a downlink (DL) resource assignment. In an Action 535a, which is not necessarily performed by the radio node 212, but may be performed by another radio node such as radio node 211 in FIG. 2, data is transmitted to the wireless device 220 from the wireless communication system. Then in an Action 540a the radio node 212 receives feedback information from the wireless device indicating the decoding result for the data transmitted to the wireless device on the respective sets of scheduled resources, wherein the decoding result reflects a combination of decoding results for the at least two CCs. The combination of decoding results for the at least two CCs may be represented by one bit per transport block.

In a further embodiment where the control information comprises scheduling information in form of an uplink resource grant that is to be applied by the wireless device to each one of the at least two CCs for identifying, on each one of the at least two CCs, respective sets of scheduled resources, the radio node 212 may perform the Action 530 as illustrated by Action 530b in FIG. 6b, where the radio node 212 transmits an uplink (UL) resource grant. In an Action 535b, which is not necessarily performed by the radio node 212, but may be performed by another radio node such as radio node 211 in FIG. 2, data is received at the wireless communication system from the wireless device 220. Then in an Action 540b the radio node 212 transmits feedback information to the wireless device 220 indicating the decoding result for the data received from the wireless device on the respective sets of scheduled resources, wherein the decoding result reflects a combination of decoding results for the at least two CCs. The combination of decoding results for the at least two CCs may be represented by one bit per transport block.

This means that in embodiments where the control information comprises scheduling information in form of a first resource assignment or resource block assignment, being a DL resource assignment or an UL resource grant, feedback information on a decoding result for the transmitted or received data is indicated for the indicated CC group such that Acknowledged, ACK, indicates successful decoding on all of the CCs comprised in the indicated CC group and Non-acknowledged, NACK, indicates unsuccessful decoding on one or more of the CCs comprised in the indicated CC group, wherein all of the CCs comprised in the indicated CC group are those CCs, out of the at least two CCs, that are associated with the indicated CC group. The first resource assignment may be transmitted in a Downlink Control Information, DCI, message, and the CC group may at least partly be indicated by bits of a Carrier Information Field, CIF, in the DCI message. The first resource assignment may in some embodiments apply equally to each one of the CCs comprised in the indicated CC group, such that a same number of resource blocks are comprised in respective sets of scheduled resources for the CCs comprised in the indicated CC group. The first resource assignment may in other embodiments apply to one or more of the CCs comprised in the indicated CC group, whereas a pre-configured or predetermined set of scheduled resources applies for remaining CCs comprised in the indicated CC group. In further embodiments where the first resource assignment may in other embodiments apply to one or more of the CCs comprised in the indicated CC group, a second resource assignment may apply to remaining CCs comprised in the indicated CC group. The second resource assignment may in some examples be provided in a second DCI message. In some embodiments, the first resource assignment or resource block assignment is to be scaled to span the full bandwidth of the indicated CC group.

Figure 7:
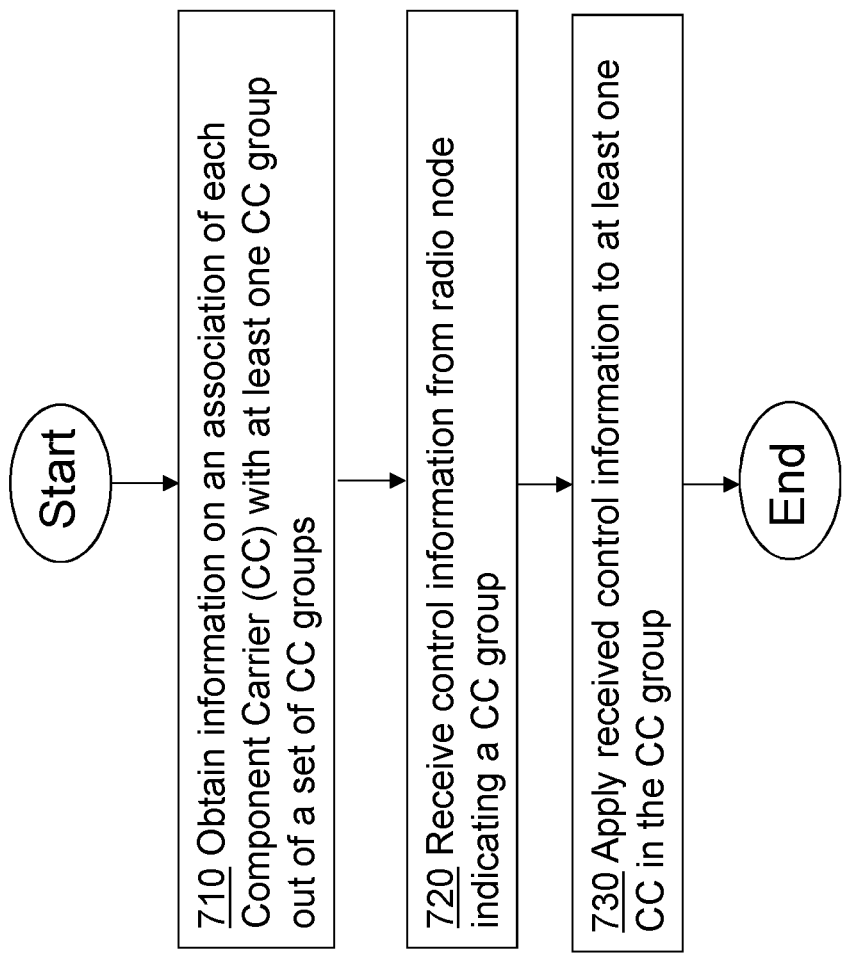
FIG. 7 is a flowchart of a method performed in a wireless device according to embodiments herein.
Figure 8B:
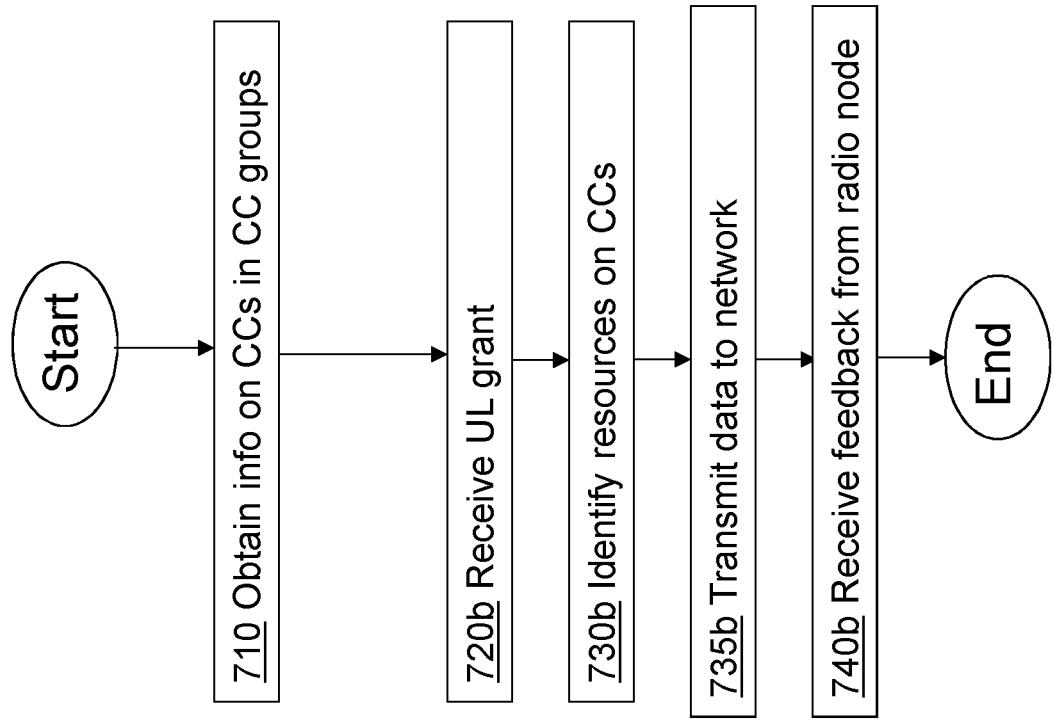
FIG. 8b is a flowchart of a method performed in a wireless device according to embodiments herein.
Figure 8A:
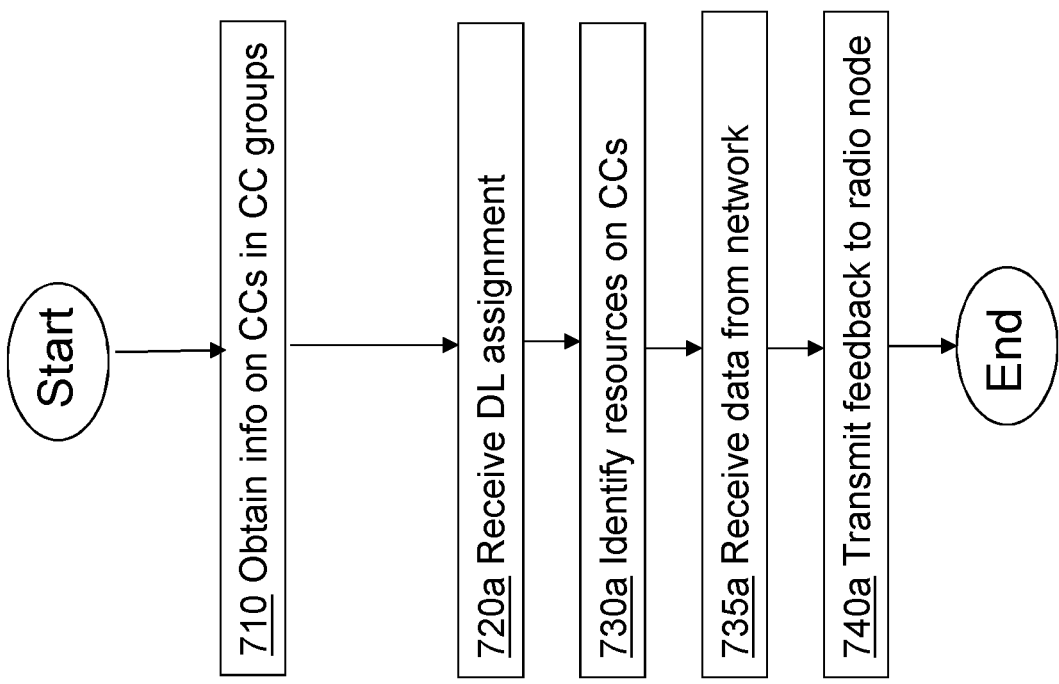
FIG. 8a is a flowchart of a method performed in a wireless device according to embodiments herein.

The method in wireless device 220 for communicating with a radio node 212 in a wireless communication system 200 will now be described with reference to flow charts depicted in FIGS. 7, 8a and 8b. In FIG. 7 an illustration of the method in the wireless device for a general case where the wireless device receives control information from the radio node 212 is provided, whereas FIGS. 8a and 8b illustrate the method in more detail for more specific cases where the transmitted control information comprises scheduling information in form of a downlink (DL) assignment and an uplink (UL) grant respectively. The wireless device 220 is configured with cells on at least two component carriers (CCs) that are available to the wireless communication system 200 for communication with the wireless device 220. The at least two CCs may comprise a CC of a Primary Cell and a CC of a Secondary Cell of the wireless device 220. At least one of the at least two CCs may in some embodiments belong to an unlicensed frequency band. The method comprises:

Action 710. The wireless device 220 obtains information on an association of each one of the at least two CCs with at least one CC group out of a set of CC groups.

Action 720. The wireless device 220 receives control information from the radio node 212 indicating a CC group. The wireless device 220 may receive the control information in a Downlink Control Information, DCI, message and identify the indicated CC group, or the at least one CC to which the received control information applies, by applying an index offset to a value set by bits in an information field in the DCI message. The control information may in some embodiments comprise scheduling information, and the information field may be a Carrier Information Field, CIF, in the DCI message. The control information may in other embodiments comprise a trigger for aperiodic Channel Status Information, CSI, reporting and the information field may be a field associated with CSI reporting in the DCI message. The control information may in further embodiments comprise a trigger for Sounding Reference Signal, SRS, transmission and the trigger may indicate that SRS should be transmitted on the at least one CC to which the received control information applies. The control information may be received on a CC of a licensed frequency band, i.e. the CC upon which the control information is received is according to such embodiments a CC of a licensed frequency band.

Action 730. The wireless device 220 applies the received control information to at least one CC. The at least one CC is at least one of those CCs, out of the at least two CCs, that are associated with the indicated CC group.

The wireless device 220 may be configured with a relation between the CC upon which the control information is transmitted by the radio node 212, which is the CC to be received upon at the wireless device 220, and the indicated CC group. The wireless device 220 may interpret the indicated CC group differently in dependence of the CC upon which the control information is received, i.e. the wireless device may determine that different CC groups are indicated depending on the CC upon which the control information is received. The indicated CC group may for example be interpreted differently in that the index offset applied by the wireless device 220 depends on the CC upon which the control information is received. The index offset may differ depending on whether the wireless device 220 is configured with the Primary Cell or the Secondary Cell on the CC upon which the control information is received.

The wireless device 220 may further, depending on transmission direction of a corresponding data transmission, (to or from the wireless device), transmit or receive feedback information on a decoding result for the indicated CC group. The feedback information may be transmitted or received on the Primary Cell or the Secondary Cell of the wireless device 220 depending on whether the index offset, that is applied to identify the indicated CC group, or the at least one CC to which the received control information applies, is an index offset of the Primary Cell or an index offset of the Secondary Cell. The index offset may be a CC group index offset or a CC index offset.

The wireless device 220 may, in an embodiment where the control information comprises the scheduling information in form of a downlink resource assignment and where the wireless device 220 is configured to apply the downlink assignment to each one of the at least two CCs for identifying, on each one of the at least two CCs, respective sets of scheduled resources, perform the Action 720 as illustrated by Action 720a in FIG. 8a, where the wireless device 220 receives a downlink (DL) resource assignment. In an Action 730a, the wireless device 220 then identifies the respective sets of scheduled resources on the CCs, and in an Action 735a, the wireless device 220 then receives data from the wireless communication system 200 on the respective sets of scheduled resources; and in an Action 740a the wireless device 220 transmits feedback information to the radio node 212 indicating the decoding result for the received data, wherein the decoding result reflects a combination of decoding results for the at least two CCs. The combination of decoding results for the at least two CCs may be represented by one bit per transport block.

In a further embodiment where the control information comprises scheduling information in form of an uplink resource grant and wherein the wireless device 220 is configured to apply the uplink resource grant to each one of the at least two CCs for identifying, on each one of the at least two CCs, respective sets of scheduled resources, the wireless device 220 may perform the Action 720 as illustrated by Action 720b in FIG. 8b, where the wireless device 220 receives a uplink (DL) resource assignment, also denoted an UL resource grant. In an action 730b the wireless device 220 then identifies the respective sets of scheduled resources on the CCs, and in an Action 735b, the wireless device 220 then transmits data to the wireless communication system 200 on the respective sets of scheduled resources; and in an Action 740b the wireless device 220 receives feedback information from the radio node 212 indicating the decoding result for the transmitted data, wherein the decoding result reflects a combination of decoding results for the at least two CCs. The combination of decoding results for the at least two CCs may be represented by one bit per transport block.

The control information may comprise scheduling information in form of a first resource assignment or resource block assignment and feedback information on a decoding result may be indicated for the indicated CC group such that Acknowledged, ACK, indicates successful decoding on all of the CCs comprised in the indicated CC group and Non-acknowledged, NACK, indicates unsuccessful decoding on one or more of the CCs comprised in the indicated CC group, wherein all of the CCs comprised in the indicated CC group are those CCs, out of the at least two CCs, that are associated with the indicated CC group. The first resource assignment or resource block assignment may be received in a Downlink Control Information, DCI, message, and the CC group may at least partly be indicated by bits of a Carrier Information Field, CIF, in the DCI message. The first resource assignment or resource block assignment may in some embodiments be applied equally to each one of the CCs comprised in the indicated CC group, such that a same number of resource blocks are comprised in respective sets of scheduled resources for the CCs comprised in the indicated CC group. The first resource assignment or resource block assignment may in other embodiments be applied to one or more of the CCs comprised in the indicated CC group, and a pre-configured or pre-defined set of scheduled resources may be applied for remaining CCs comprised in the indicated CC group. The first assignment or resource block assignment may in one alternative be applied only to one or more of the CCs comprised in the indicated CC group. The first resource assignment or resource block assignment may in other embodiments be applied to one or more of the CCs comprised in the indicated CC group, and a second resource assignment or resource block assignment may be applied to remaining CCs comprised in the indicated CC group. The first resource assignment or resource block assignment may in some embodiments be scaled by the wireless device 220 to span the full bandwidth of the indicated CC group.

Figure 9:
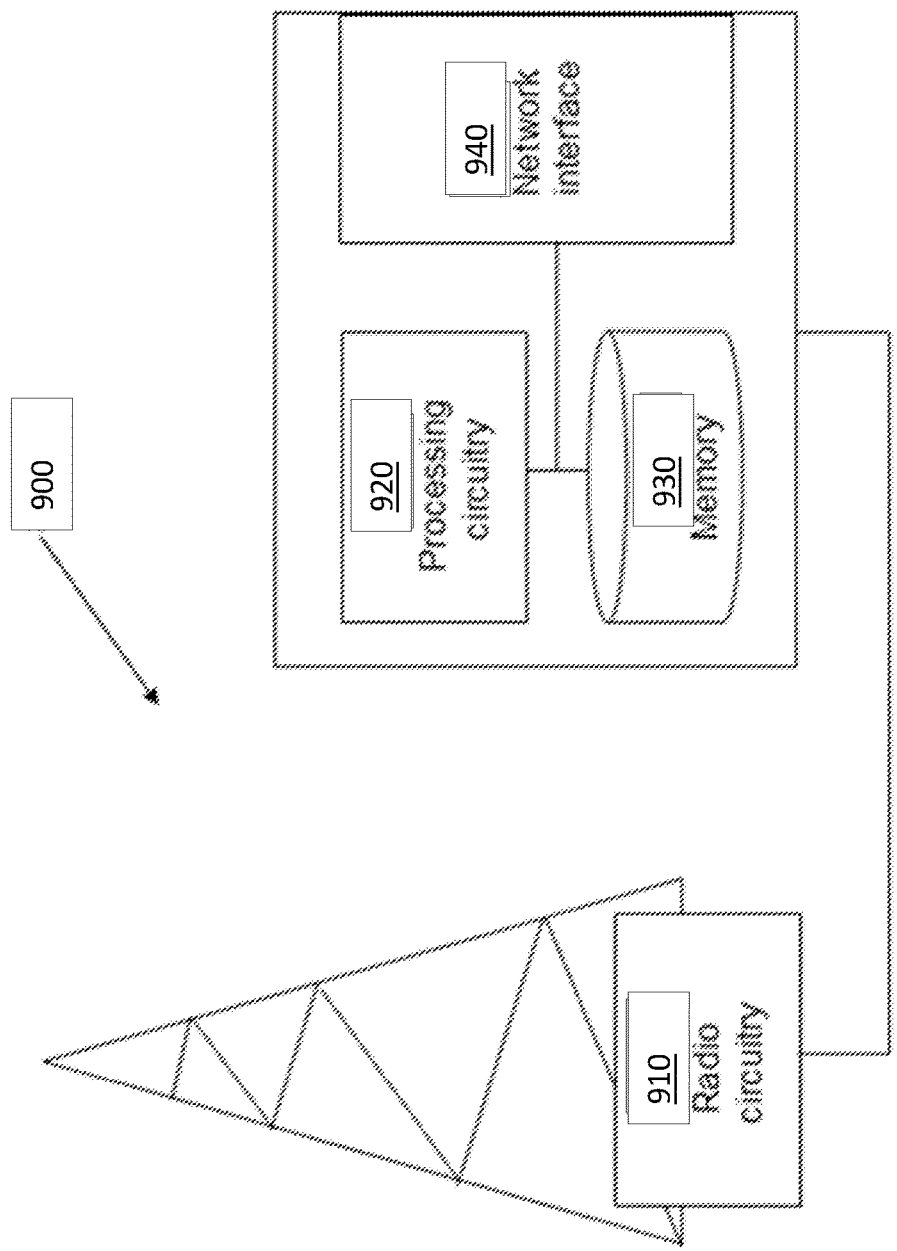
FIG. 9 is a block diagram depicting a radio access node according to embodiments herein.

In order to perform the methods herein a radio node 900, such as the radio node 212 is provided. FIG. 9 is a block diagram depicting the radio node 900 for communicating with a wireless device 220 that has been configured with cells on at least two component carriers, CCs, in a wireless communication system 200. The at least two CCs are available to the wireless communication system 200 for communication with the wireless device 220. The at least two CCs may comprise a CC of a Primary Cell and a CC of a Secondary Cell of the wireless device 220. At least one of the at least two CCs may in some embodiments belong to an unlicensed frequency band.

The radio node 900 comprises radio circuitry 910 for wireless communication e.g. with wireless device 220, processing circuitry 920, memory 930 and a network interface 940 e.g. for communicating with other network or radio nodes, such as radio node 211. The radio node 900 is configured to, by comprising the processing circuitry 920 being configured to, associate each one of the at least two CCs with at least one CC group out of a set of CC groups. The radio node 900 being configured to, by the processing circuitry 920 being configured to, associate each one of the at least two CCs with at least one CC group may further comprise the radio node 900 being configured to, by the processing circuitry 920 being configured to, define one or more component carrier, CC, groups to be comprised in the set of CC groups.

The radio node 900 is further configured to, by comprising the radio circuitry 910 being configured to, transmit control information to the wireless device 220 indicating a CC group. The transmitted control information applies to at least one CC. The at least one CC is at least one of those CCs, out of the at least two CCs, that are associated with the indicated CC group. The CC group may be at least partly indicated by the radio node 900 being configured to, by the radio circuitry 910 being configured to, select a CC upon which the control information is transmitted in dependence of the CC group to be indicated to the wireless device 220.

The radio node 900 may further be configured to, by the radio circuitry 910 being configured to, configure the wireless device 220 with a relation between the CC upon which the control information is transmitted and the indicated CC group. The radio node 900 being configured to, by the radio circuitry 910 being configured to, configure the wireless device 220 with a relation between the CC upon which the control information is transmitted and the indicated CC group may further comprise the radio node 900 being configured to, by the radio circuitry 910 being configured to, configure the wireless device 220 with an index offset that depends on the CC upon which the control information is transmitted. The index offset may differ depending on whether the wireless device 220 is configured with the Primary Cell or the Secondary Cell on the CC upon which the control information is transmitted.

The radio node 900 may further be configured to, by the radio circuitry 910 being configured to, transmit the control information in a Downlink Control Information, DCI, message, wherein the indicated CC group, or the at least one CC to which the transmitted control information applies, is identifiable by applying the index offset to a value set by bits in an information field in the DCI message. The control information may in some embodiments comprise scheduling information, and the information field may be a Carrier Information Field, CIF, in the DCI message. In further embodiments, the control information may comprise a trigger for Sounding Reference Signal, SRS, transmission. In such embodiments the trigger may indicate that SRS should be transmitted on the at least one CC to which the transmitted control information applies. In other embodiments, the control information may comprise a trigger for aperiodic Channel Status Information, CSI, reporting. In such embodiments the information field is a field associated with CSI reporting in the DCI message.

The radio node 900 may further be configured to, by the radio circuitry 910 being configured to, transmit feedback information on a decoding result for the indicated CC group on the Primary Cell or the Secondary Cell of the wireless device 220 depending on whether the index offset, by which the indicated CC group or the at least one CC to which the transmitted control information applies is identifiable, is an index offset of the Primary Cell or an index offset of the Secondary Cell. Alternatively or additionally, the radio node 900 may further be configured to, by the radio circuitry 910 being configured to, receive feedback information on a decoding result for the indicated CC group on the Primary Cell or the Secondary Cell of the wireless device 220 depending on whether the index offset, by which the indicated CC group or the at least one CC to which the transmitted control information applies is identifiable, is an index offset of the Primary Cell or an index offset of the Secondary Cell.

In some embodiments, the control information comprises scheduling information in form of a first resource assignment and feedback information on a decoding result is indicated for the indicated CC group such that Acknowledged, ACK, indicates successful decoding on all of the CCs comprised in the indicated CC group and Non-acknowledged, NACK, indicates unsuccessful decoding on one or more of the CCs comprised in the indicated CC group. In such embodiments, the radio node 900 may further be configured to, by the radio circuitry 910 being configured to, transmit the first resource assignment in a Downlink Control Information, DCI, message, and the CC group may be at least partly indicated by bits of a Carrier Information Field, CIF, in the DCI message. The first resource assignment may in some embodiments apply equally to each one of the CCs comprised in the indicated CC group, such that a same amount of resources are comprised in respective sets of scheduled resources for the CCs comprised in the indicated CC group. In other embodiments the first resource assignment may apply to one or more of the CCs comprised in the indicated CC group, and a pre-configured set of scheduled resources may apply for remaining CCs comprised in the indicated CC group. The radio node 900 may be configured to, by the radio circuitry 910 being configured to, select the pre-configured set of scheduled resources from a set of pre-configured sets of resources for scheduling. In yet other embodiments the first resource assignment may apply to one or more of the CCs comprised in the indicated CC group, and a second resource assignment may apply to remaining CCs comprised in the indicated CC group. The second resource assignment may in some examples be provided in a second DCI message. In some embodiments the first resource assignment is to be scaled to span the full bandwidth of the indicated CC group.

Figure 10:
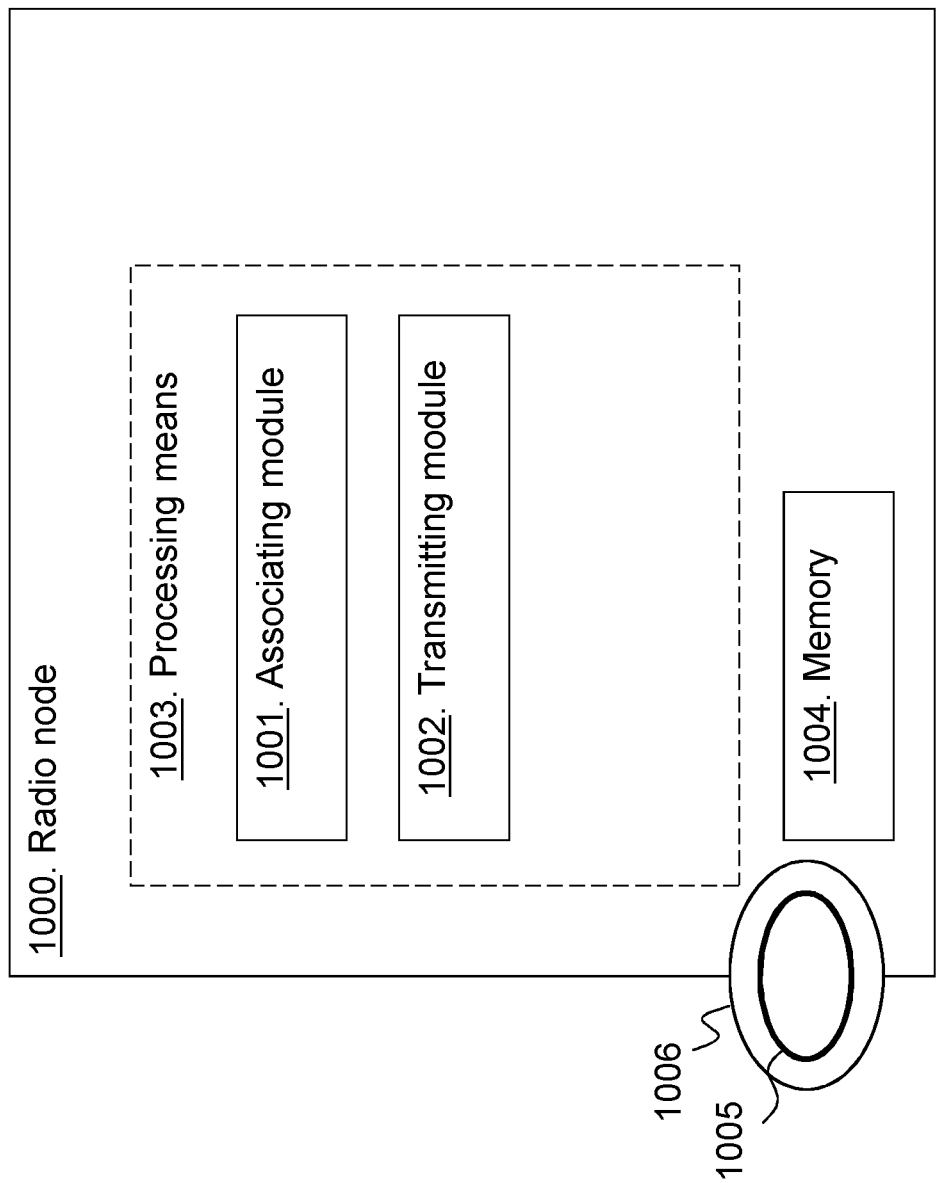
FIG. 10 is a block diagram depicting a radio access node according to embodiments herein.

In an alternative embodiment, in order to perform the methods herein a radio node 1000, such as the radio node 212 is provided. FIG. 10 is a block diagram depicting the radio node 1000 for communicating with a wireless device 220 that has been configured with cells on at least two component carriers, CCs, in a wireless communication system 200. The at least two CCs are available to the wireless communication system 200 for communication with the wireless device 220. The at least two CCs may comprise a CC of a Primary Cell and a CC of a Secondary Cell of the wireless device 220. At least one of the at least two CCs may in some embodiments belong to an unlicensed frequency band.

The radio node 1000 is configured to, by comprising an associating module 1001 being configured to, associate each one of the at least two CCs with at least one CC group out of a set of CC groups. The radio node 1000 being configured to, by the associating module 1001 being configured to, associate each one of the at least two CCs with at least one CC group may further comprise the radio node 1000 being configured to, by the associating module 1001 being configured to, define one or more component carrier, CC, groups to be comprised in the set of CC groups.

The radio node 1000 is further configured to, by comprising a transmitting module 1002 being configured to, transmit control information to the wireless device 220 indicating a CC group. The transmitted control information applies to at least one CC. The at least one CC is at least one of those CCs, out of the at least two CCs, that are associated with the indicated CC group. The CC group may be at least partly indicated by the radio node 1000 being configured to, by the transmitting module 1002 being configured to, select a CC upon which the control information is transmitted in dependence of the CC group to be indicated to the wireless device 220.

The radio node 1000 may further be configured to, by the transmitting module 1002 being configured to, configure the wireless device 220 with a relation between the CC upon which the control information is transmitted and the indicated CC group. The radio node 1000 being configured to, by the transmitting module 1002 being configured to, configure the wireless device 220 with a relation between the CC upon which the control information is transmitted and the indicated CC group may further comprise the radio node 1000 being configured to, by the transmitting module 1002 being configured to, configure the wireless device 220 with an index offset that depends on the CC upon which the control information is transmitted. The index offset may differ depending on whether the wireless device 220 is configured with the Primary Cell or the Secondary Cell on the CC upon which the control information is transmitted.

The radio node 1000 may further be configured to, by the transmitting module 1002 being configured to, transmit the control information in a Downlink Control Information, DCI, message, wherein the indicated CC group, or the at least one CC to which the transmitted control information applies, is identifiable by applying the index offset to a value set by bits in an information field in the DCI message. The control information may in some embodiments comprise scheduling information, and the information field may be a Carrier Information Field, CIF, in the DCI message. In further embodiments, the control information may comprise a trigger for Sounding Reference Signal, SRS, transmission. In such embodiments the trigger may indicate that SRS should be transmitted on the at least one CC to which the transmitted control information applies. In other embodiments, the control information may comprise a trigger for aperiodic Channel Status Information, CSI, reporting. In such embodiments the information field is a field associated with CSI reporting in the DCI message.

The radio node 1000 may further be configured to, by the transmitting module 1002 being configured to, transmit feedback information on a decoding result for the indicated CC group on the Primary Cell or the Secondary Cell of the wireless device 220 depending on whether the index offset, by which the indicated CC group or the at least one CC to which the transmitted control information applies is identifiable, is an index offset of the Primary Cell or an index offset of the Secondary Cell. Alternatively or additionally, the radio node 1000 may further be configured to, by a receiving module (not shown) being configured to, receive feedback information on a decoding result for the indicated CC group on the Primary Cell or the Secondary Cell of the wireless device 220 depending on whether the index offset, by which the indicated CC group or the at least one CC to which the transmitted control information applies is identifiable, is an index offset of the Primary Cell or an index offset of the Secondary Cell.

In some embodiments, the control information comprises scheduling information in form of a first resource assignment and feedback information on a decoding result is indicated for the indicated CC group such that Acknowledged, ACK, indicates successful decoding on all of the CCs comprised in the indicated CC group and Non-acknowledged, NACK, indicates unsuccessful decoding on one or more of the CCs comprised in the indicated CC group. In such embodiments, the radio node 1000 may further be configured to, by the transmitting module 1002 being configured to, transmit the first resource assignment in a Downlink Control Information, DCI, message, and the CC group may be at least partly indicated by bits of a Carrier Information Field, CIF, in the DCI message. The first resource assignment may in some embodiments apply equally to each one of the CCs comprised in the indicated CC group, such that a same amount of resources are comprised in respective sets of scheduled resources for the CCs comprised in the indicated CC group. In other embodiments the first resource assignment may apply to one or more of the CCs comprised in the indicated CC group, and a pre-configured set of scheduled resources may apply for remaining CCs comprised in the indicated CC group. The radio node 1000 may be configured to, by a selecting module (not shown) being configured to, select the pre-configured set of scheduled resources from a set of pre-configured sets of resources for scheduling. In yet other embodiments the first resource assignment may apply to one or more of the CCs comprised in the indicated CC group, and a second resource assignment may apply to remaining CCs comprised in the indicated CC group. The second resource assignment may in some examples be provided in a second DCI message. In some embodiments the first resource assignment is to be scaled to span the full bandwidth of the indicated CC group.

The embodiments herein for for communicating with the wireless device 220 may be implemented through processing means 1003, for example one or more processors, in the radio node 1000 depicted in FIG. 10, e.g. together with computer program code, which processor or processing means 1003 is configured to perform the functions and/or method actions of the embodiments herein.

The radio node 1000 further comprises a memory 1004. The memory comprises one or more units to be used to store data on, such as pre-configured information, information on associations between CC groups and CCs, applications to perform the methods disclosed herein when being executed, and similar.

The methods according to the embodiments described herein for the radio node 1000 may be implemented by means of e.g. a computer program 1005 or a computer program product, comprising instructions, i.e., software code portions, which, when executed on at least one processor, cause the at least one processor to carry out the actions described herein, as performed by the radio node 1000. The computer program 1005 may be stored on a computer-readable storage medium 1006, e.g. a disc or similar. The computer-readable storage medium 1006, having stored there on the computer program 1005, may comprise the instructions which, when executed on at least one processor, cause the at least one processor to carry out the actions described herein, as performed by the radio node 1000. In some embodiments, the computer-readable storage medium 1006 may be a non-transitory computer-readable storage medium.

Figure 11:
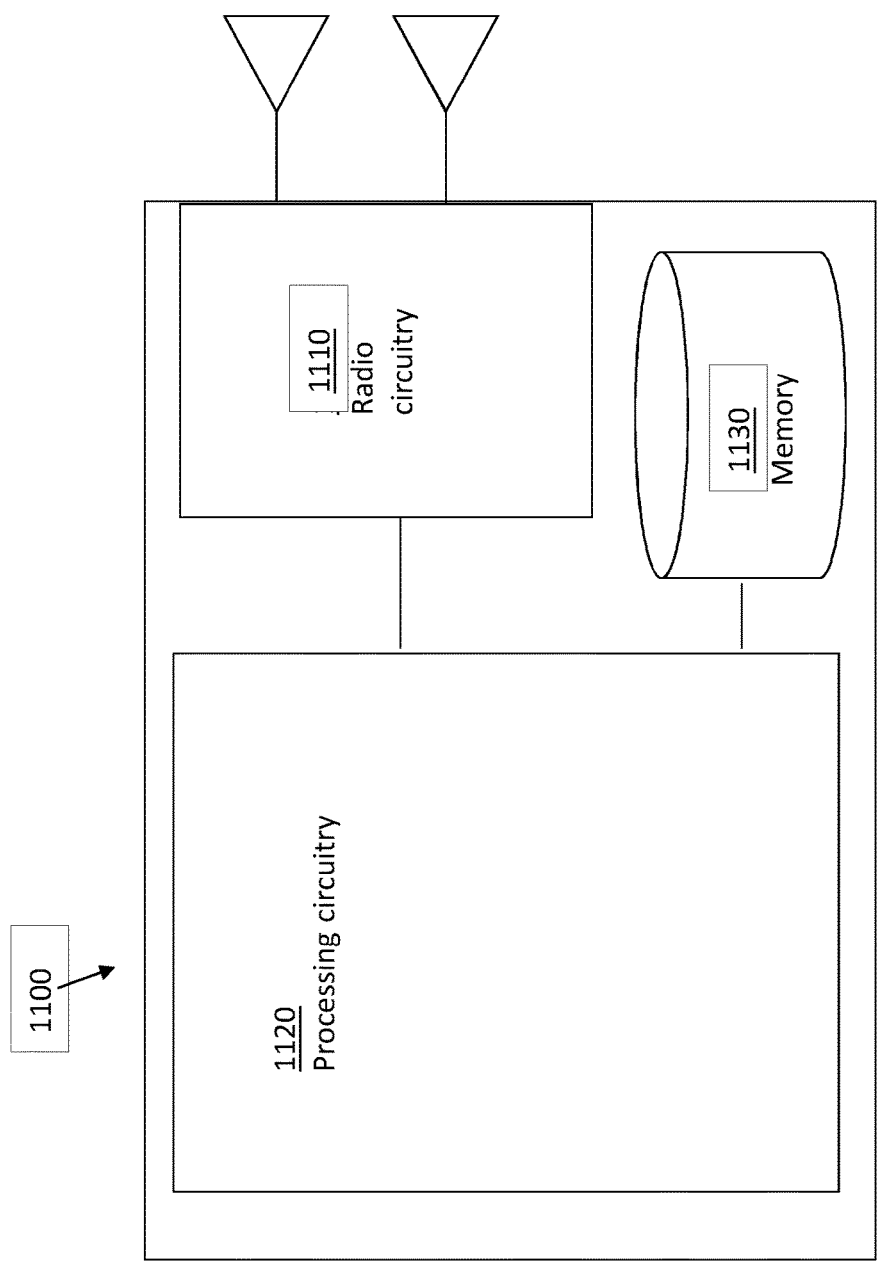
FIG. 11 is a block diagram depicting a wireless device according to embodiments herein.

FIG. 11 is a block diagram depicting the wireless device 1100, e.g. wireless device 220, for communicating with a radio node 212 in a wireless communication system 200. The wireless device 1100 is configurable with cells on at least two component carriers, CCs, available to the wireless communication system 200 for communication with the wireless device 220, 1100. The at least two CCs may comprise a CC of a Primary Cell and a CC of a Secondary Cell of the wireless device 1100. At least one of the at least two CCs may in some embodiments belong to an unlicensed frequency band.

The wireless device 1100 comprises radio circuitry 1110 for wireless communication e.g. with radio node 212, processing circuitry 1120 and memory 1130. The wireless device 1100 is configured to, by comprising the radio circuitry 1110 being configured to, obtain information on an association of each one of the at least two CCs with at least one CC group out of a set of CC groups.

The wireless device 1100 is further configured to, by comprising the radio circuitry 1110 being configured to, receive control information from the radio node 212 indicating a CC group. The wireless device 1100 may be configured to, by the radio circuitry 1110 being configured to, receive the control information in a Downlink Control Information, DCI, message and to identify the indicated CC group, or the at least one CC to which the received control information applies, by applying the index offset to a value set by bits in an information field in the DCI message. The control information may in some embodiments comprise scheduling information, and the information field may be a Carrier Information Field, CIF, in the DCI message. The control information may in other embodiments comprise a trigger for aperiodic Channel Status Information, CSI, reporting and the information field may be a field associated with CSI reporting in the DCI message. The control information may in further embodiments comprise a trigger for Sounding Reference Signal, SRS, transmission and the trigger may indicate that SRS should be transmitted on the at least one CC to which the received control information applies. The wireless device 1100 may further be configured to, by the radio circuitry 1110 being configured to, receive the control information on a CC of a licensed frequency band, i.e. the CC upon which the control information is received is according to such embodiments a CC of a licensed frequency band.

The wireless device 1100 is further configured to, by comprising processing circuitry 1120 being configured to, apply the received control information to at least one CC. The at least one CC is at least one of those CCs, out of the at least two CCs, that are associated with the indicated CC group.

The wireless device 1100 may be configured with a relation between a CC upon which the control information is received and the indicated CC group. The wireless device 1100 may further be configured to interpret the indicated CC group differently in dependence of the CC upon which the control information is received. The wireless device 1100 may for example be configured to interpret the indicated CC group differently by applying an offset index that depends on the CC upon which the control information is received. The index offset may differ depending on whether the wireless device 1100 is configured with the Primary Cell or the Secondary Cell on the CC upon which the control information is received.

The wireless device 1100 may further be configured to, by the radio circuitry 1110 being configured to, transmit feedback information on a decoding result for the indicated CC group on the Primary Cell or the Secondary Cell of the wireless device 1100 depending on whether the index offset that is applied to identify the indicated CC group, or the at least one CC to which the received control information applies, is an index offset of the Primary Cell or an index offset of the Secondary Cell. Alternatively or additionally, the wireless device 1100 may further be configured to, by the radio circuitry 1110 being configured to, receive feedback information on a decoding result for the indicated CC group on the Primary Cell or the Secondary Cell of the wireless device 1100 depending on whether the index offset that is applied to identify the indicated CC group, or the at least one CC to which the received control information applies, is an index offset of the Primary Cell or an index offset of the Secondary Cell.

In some embodiments, the control information comprises scheduling information in form of a first resource assignment and feedback information on a decoding result is indicated for the indicated CC group such that Acknowledged, ACK, indicates successful decoding on all of the CCs comprised in the indicated CC group and Non-acknowledged, NACK, indicates unsuccessful decoding on one or more of the CCs comprised in the indicated CC group. In such embodiments, the wireless device 1100 may further be configured to, by the radio circuitry 1110 being configured to, receive the first resource assignment in a Downlink Control Information, DCI, message, and the CC group may be at least partly indicated by bits of a Carrier Information Field, CIF, in the DCI message. The first resource assignment may in some embodiments apply equally to each one of the CCs comprised in the indicated CC group, such that a same amount of resources are comprised in respective sets of scheduled resources for the CCs comprised in the indicated CC group. In other embodiments the first resource assignment may apply to one or more of the CCs comprised in the indicated CC group, and a pre-configured set of scheduled resources may apply for remaining CCs comprised in the indicated CC group. In yet other embodiments the first resource assignment may apply to one or more of the CCs comprised in the indicated CC group, and a second resource assignment may apply to remaining CCs comprised in the indicated CC group. The second resource assignment may in some examples be provided in a second DCI message. In some embodiments the wireless device 1100 may be configured to scale the first resource assignment to span the full bandwidth of the indicated CC group.

Figure 12:
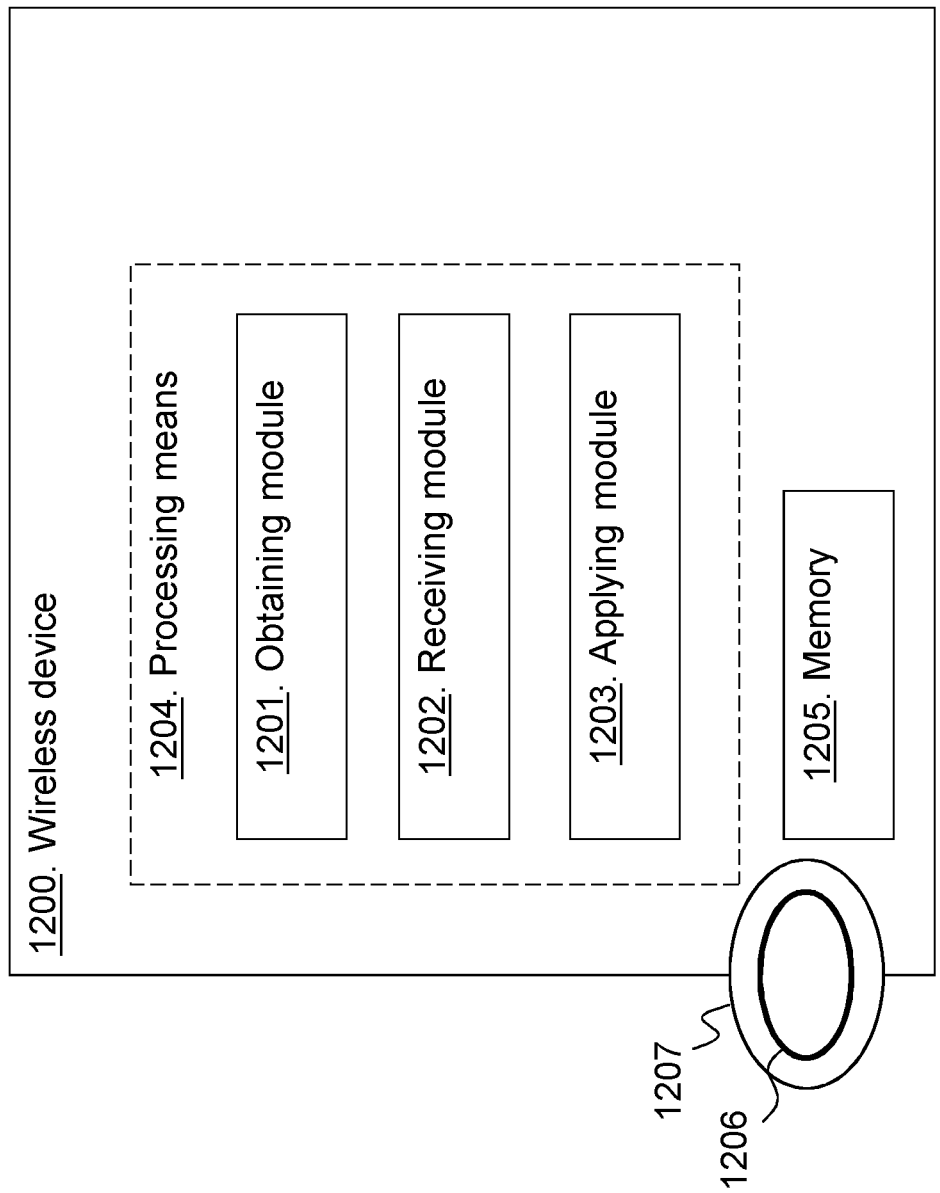
FIG. 12 is a block diagram depicting a wireless device according to embodiments herein.

FIG. 12 is a block diagram depicting an alternative embodiment of a wireless device 1200, e.g. wireless device 220, for communicating with a radio node 212 in a wireless communication system 200. The wireless device 1200 is configurable with cells on at least two component carriers, CCs, available to the wireless communication system 200 for communication with the wireless device 220, 1200. The at least two CCs may comprise a CC of a Primary Cell and a CC of a Secondary Cell of the wireless device 1200. At least one of the at least two CCs may in some embodiments belong to an unlicensed frequency band.

The wireless device 1200 is configured to, by comprising an obtaining module 1201 being configured to, obtain information on an association of each one of the at least two CCs with at least one CC group out of a set of CC groups.

The wireless device 1200 is further configured to, by comprising a receiving module 1202 being configured to, receive control information from the radio node 212 indicating a CC group. The wireless device 1200 may be configured to, by the receiving module 1202 being configured to, receive the control information in a Downlink Control Information, DCI, message and to identify the indicated CC group, or the at least one CC to which the received control information applies, by applying the index offset to a value set by bits in an information field in the DCI message. The control information may in some embodiments comprise scheduling information, and the information field may be a Carrier Information Field, CIF, in the DCI message. The control information may in other embodiments comprise a trigger for aperiodic Channel Status Information, CSI, reporting and the information field may be a field associated with CSI reporting in the DCI message. The control information may in further embodiments comprise a trigger for Sounding Reference Signal, SRS, transmission and the trigger may indicate that SRS should be transmitted on the at least one CC to which the received control information applies. The wireless device 1200 may further be configured to, by the receiving module 1202 being configured to, receive the control information on a CC of a licensed frequency band, i.e. the CC upon which the control information is received is according to such embodiments a CC of a licensed frequency band.

The wireless device 1200 is further configured to, by comprising an applying module 1203 being configured to, apply the received control information to at least one CC. The at least one CC is at least one of those CCs, out of the at least two CCs, that are associated with the indicated CC group.

The wireless device 1200 may be configured with a relation between a CC upon which the control information is received and the indicated CC group. The wireless device 1200 may further be configured to interpret the indicated CC group differently in dependence of the CC upon which the control information is received. The wireless device 1200 may for example be configured to interpret the indicated CC group differently by applying an offset index that depends on the CC upon which the control information is received. The index offset may differ depending on whether the wireless device 1200 is configured with the Primary Cell or the Secondary Cell on the CC upon which the control information is received.

The wireless device 1200 may further be configured to, by the receiving module 1202 being configured to, transmit feedback information on a decoding result for the indicated CC group on the Primary Cell or the Secondary Cell of the wireless device 1200 depending on whether the index offset that is applied to identify the indicated CC group, or the at least one CC to which the received control information applies, is an index offset of the Primary Cell or an index offset of the Secondary Cell. Alternatively or additionally, the wireless device 1200 may further be configured to, by a transmitting module (not shown) being configured to, receive feedback information on a decoding result for the indicated CC group on the Primary Cell or the Secondary Cell of the wireless device 1200 depending on whether the index offset that is applied to identify the indicated CC group, or the at least one CC to which the received control information applies, is an index offset of the Primary Cell or an index offset of the Secondary Cell.

In some embodiments, the control information comprises scheduling information in form of a first resource assignment and feedback information on a decoding result is indicated for the indicated CC group such that Acknowledged, ACK, indicates successful decoding on all of the CCs comprised in the indicated CC group and Non-acknowledged, NACK, indicates unsuccessful decoding on one or more of the CCs comprised in the indicated CC group. In such embodiments, the wireless device 1200 may further be configured to, by the receiving module 1202 being configured to, receive the first resource assignment in a Downlink Control Information, DCI, message, and the CC group may be at least partly indicated by bits of a Carrier Information Field, CIF, in the DCI message. The first resource assignment may in some embodiments apply equally to each one of the CCs comprised in the indicated CC group, such that a same amount of resources are comprised in respective sets of scheduled resources for the CCs comprised in the indicated CC group. In other embodiments the first resource assignment may apply to one or more of the CCs comprised in the indicated CC group, and a pre-configured set of scheduled resources may apply for remaining CCs comprised in the indicated CC group. In yet other embodiments the first resource assignment may apply to one or more of the CCs comprised in the indicated CC group, and a second resource assignment may apply to remaining CCs comprised in the indicated CC group. The second resource assignment may in some examples be provided in a second DCI message. In some embodiments the wireless device 1200 may be configured to scale the first resource assignment to span the full bandwidth of the indicated CC group.

The embodiments herein for scheduling the control channel and/or the data channel may be implemented through processing means 1204, for example one or more processors, in the wireless device 1200 depicted in FIG. 12, e.g. together with computer program code, which processor or processing means 1204 is configured to perform the functions and/or method actions of the embodiments herein.

The wireless device 1200 further comprises a memory 1205. The memory comprises one or more units to be used to store data on, such as DCI information, information on associations between CC groups and CCs, configurations and applications to perform the methods disclosed herein when being executed, and similar.

The methods according to the embodiments described herein for the wireless device 1200 may be implemented by means of e.g. a computer program 1206 or a computer program product, comprising instructions, i.e., software code portions, which, when executed on at least one processor, cause the at least one processor to carry out the actions described herein, as performed by the wireless device 1200. The computer program 1206 may be stored on a computer-readable storage medium 1207, e.g. a disc or similar. The computer-readable storage medium 1207, having stored there on the computer program 1206, may comprise the instructions which, when executed on at least one processor, cause the at least one processor to carry out the actions described herein, as performed by the wireless device 1200. In some embodiments, the computer-readable storage medium 1207 may be a non-transitory computer-readable storage medium.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or radio node, for example.

Alternatively, several of the functional elements of the processor or processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of devices and radio nodes will appreciate the cost, performance, and maintenance trade-offs inherent in these design choices.

Modifications and other embodiments of the disclosed embodiments will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method, performed by a radio node, for communicating with a wireless device in a wireless communication system, wherein the radio node applies cross-carrier scheduling, and wherein the wireless device being configured with at least two scheduling component carriers (CCs) available to the wireless communication system for communication with the wireless device, the method comprising:
   associating each one of the at least two scheduling CCs with a respective different group of CCs;
   configuring the wireless device with a relation between the scheduling CC upon which control information will be transmitted and the respective one of the different groups of CCs; and
   transmitting, on one of the scheduling CCs, control information comprising scheduling information in a downlink control information message to the wireless device, wherein the scheduling information in the transmitted control information applies to a CC of the respective one of the different groups of CCs, the CC being determined based on a value of a carrier indicator field in the transmitted control information and based on the one of the scheduling CCs on which the control information is transmitted;
   wherein configuring the wireless device comprises configuring the wireless device with an index offset that depends on the scheduling CC upon which the control information is transmitted;
   wherein the at least two scheduling CCs comprise a primary component carrier and a secondary component carrier of the wireless device; and
   wherein the index offset related to the primary component carrier differs from the index offset related to the secondary component carrier.

2. The method of claim 1:
   wherein the control information is transmitted in a Downlink Control Information (DCI) message; and
   wherein the CC of the respective one of the different groups of CCs, to which the transmitted control information applies, is identifiable by applying the index offset to a value set by bits in an information field in the DCI message.

3. The method of claim 2, wherein the information field is a Carrier Information Field (CIF) in the DCI message.

4. The method of claim 2:
   wherein the control information comprises a trigger for Sounding Reference Signal (SRS) transmission; and
   wherein the trigger indicates that SRS should be transmitted on the CC of the respective one of the different groups of CCs to which the transmitted control information applies.

5. The method of claim 2:
   wherein the control information comprises a trigger for aperiodic Channel Status Information (CSI) reporting; and
   wherein the information field is a field associated with CSI reporting in the DCI message.

6. The method of claim 3:
   wherein feedback information on a decoding result for the CC of the respective one of the different groups of CCs is received or transmitted on the primary component carrier or the secondary component carrier of the wireless device depending on whether the index offset, by which the CC of the respective one of the different groups of CCs to which the transmitted control information applies is identifiable, is an index offset of the primary component carrier or an index offset of the secondary component carrier.

7. The method of claim 3:
   wherein the control information comprises scheduling information in form of a first resource assignment;
   wherein feedback information on a decoding result is indicated for the respective one of the different groups of CCs such that Acknowledged (ACK) indicates successful decoding on all of the CCs comprised in the respective one of the different groups of CCs and Non-acknowledged (NACK) indicates unsuccessful decoding on one or more of the CCs comprised in the respective one of the different groups of CCs.

8. The method of claim 7:
   wherein the first resource assignment is transmitted in a Downlink Control Information (DCI) message; and
   wherein the respective one of the different groups of CCs is at least partly indicated by bits of a Carrier Information Field (CIF) in the DCI message.

9. The method of claim 7, wherein the first resource assignment applies equally to each one of the CCs comprised in the respective one of the different groups of CCs, such that a same amount of resources are comprised in respective sets of scheduled resources for the CCs comprised in the respective one of the different groups of CCs.

10. The method of claim 7:
wherein the first resource assignment applies to one or more, but less than all, of the CCs comprised in the respective one of the different groups of CCs; and
wherein a pre-configured set of scheduled resources applies for remaining CCs comprised in the respective one of the different groups of CCs.

11. The method of claim 10, further comprising selecting the pre-configured set of scheduled resources from a set of pre-configured sets of resources for scheduling.

12. The method of claim 7:
wherein the first resource assignment applies to one or more of the CCs comprised in the respective one of the different groups of CCs; and
wherein a second resource assignment applies to remaining CCs comprised in the respective one of the different groups of CCs.

13. The method of claim 12, wherein the first resource assignment is to be scaled to span the full bandwidth of the respective one of the different groups of CCs.

14. The method of claim 13, wherein associating each one of the at least two scheduling CCs with a respective different group of CCs comprises defining one or more CC groups to be comprised in the respective different group of CCs.

15. A method, performed by a wireless device, for communicating with a radio node in a wireless communication system, wherein the radio node is configured to apply cross-carrier scheduling, and wherein the wireless device is configured with at least two scheduling component carriers (CCs) available to the wireless communication system for communication with the wireless device, the method comprising:
obtaining information on an association of each one of the at least two scheduling CCs with a respective different group of CCs;
receiving control information comprising scheduling information in a downlink control information message from the radio node, wherein the control information is received on one of the scheduling CCs;
determining a CC of the respective one of the different groups of CCs based on a value of a carrier indicator field in the received control information and on the one of the scheduling CCs on which the control information is received; and
applying the scheduling information in the received control information to the determined CC;
wherein the wireless device is configured with a relation between the scheduling CC upon which the control information is received and the respective one of the different groups of CCs;
wherein the wireless device interprets the respective one of the different groups of CCs differently by applying an index offset that depends on the scheduling CC upon which the control information is received;
wherein the at least two scheduling CCs comprise a primary component carrier and a secondary component carrier of the wireless device; and
wherein the index offset related to the primary component carrier differs from the index offset related to the secondary component carrier.

16. The method of claim 15, wherein the wireless device receives the control information in a Downlink Control Information (DCI) message and identifies the CC of the respective one of the different groups of CCs, to which the received control information applies, by applying the index offset to a value set by bits in an information field in the DCI message.

17. The method of claim 16:
wherein the information field is a Carrier Information Field (CIF) in the DCI message.

18. The method of claim 16:
wherein the control information comprises a trigger for Sounding Reference Signal (SRS) transmission; and
wherein the trigger indicates that SRS should be transmitted on the CC of the respective one of the different groups of CCs to which the received control information applies.

19. The method of claim 16:
wherein the control information comprises a trigger for aperiodic Channel Status Information (CSI) reporting; and
wherein the information field is a field associated with CSI reporting in the DCI message.

20. The method of claim 17:
wherein feedback information on a decoding result for the CC of the respective one of the different groups of CCs is transmitted or received on the primary component carrier or the secondary component carrier of the wireless device depending on whether the index offset that is applied to identify the CC of the respective one of the different groups of CCs, to which the received control information applies, is an index offset of the primary component carrier or an index offset of the secondary component carrier.

21. The method of claim 17:
wherein the control information comprises scheduling information in form of a first resource assignment; and
wherein feedback information on a decoding result is indicated for the respective one of the different groups of CCs such that Acknowledged (ACK) indicates successful decoding on all of the CCs comprised in the respective one of the different groups of CCs and Non-acknowledged (NACK) indicates unsuccessful decoding on one or more of the CCs comprised in the respective one of the different groups of CCs.

22. The method of claim 21:
wherein the first resource assignment is received in a Downlink Control Information (DCI) message; and
wherein the respective one of the different groups of CCs is at least partly indicated by bits of a Carrier Information Field (CIF) in the DCI message.

23. The method of claim 21 wherein the first resource assignment applies equally to each one of the CCs comprised in the respective one of the different groups of CCs, such that a same amount of resources are comprised in respective sets of scheduled resources for the CCs comprised in the respective one of the different groups of CCs.

24. The method of claim 21:
wherein the first resource assignment applies to one or more, but less than all, of the CCs comprised in the respective one of the different groups of CCs; and
wherein a pre-configured set of scheduled resources applies for remaining CCs comprised in the respective one of the different groups of CCs.

25. The method of claim 21:
wherein the first resource assignment applies to one or more of the CCs comprised in the respective one of the different groups of CCs; and
wherein a second resource assignment applies to remaining CCs comprised in the respective one of the different groups of CCs.

26. The method of claim 21, wherein the first resource assignment is to be scaled to span the full bandwidth of the respective one of the different groups of CCs.

27. A radio node for communicating with a wireless device, wherein the radio node applies cross-carrier scheduling, and wherein the wireless device has been configured with at least two scheduling component carriers (CCs) in a wireless communication system, the at least two CCs being available to the wireless communication system for communication with the wireless device, the radio node comprising:
processing circuitry; and
memory containing instructions executable by the processing circuitry whereby the radio node is operative to:
associate each one of the at least two scheduling CCs with a respective different group of CCs; and
transmit, on one of the scheduling CCs, control information comprising scheduling information in a downlink control information message to the wireless device, wherein the scheduling information in the transmitted control information applies a CC of the respective one of the different groups of CCs, the CC being determined based on a value of a carrier indicator field in the transmitted control information and based on the one of the scheduling CCs on which the control information is transmitted;
wherein the instructions are such that the radio node is:
operative to configure the wireless device with a relation between the scheduling CC upon which the control information is transmitted and the respective one of the different groups of CCs;
configure the wireless device with an index offset that depends on the scheduling CC upon which the control information is transmitted;
wherein the at least two scheduling CCs comprise a primary component carrier and a secondary component carrier of the wireless device; and
wherein the index offset related to the primary component carrier differs from the index offset related to the secondary component carrier.

28. The radio node of claim 27:
wherein the instructions are such that the radio node is operative to transmit the control information in a Downlink Control Information (DCI) message; and
wherein the CC of the respective one of the different groups of CCs, to which the transmitted control information applies, is identifiable by applying the index offset to a value set by bits in an information field in the DCI message.

29. The radio node of claim 28:
wherein the information field is a Carrier Information Field (CIF) in the DCI message.

30. The radio node of claim 28:
wherein the control information comprises a trigger for Sounding Reference Signal (SRS) transmission; and
wherein the trigger indicates that SRS should be transmitted on the CC of the respective one of the different groups of CCs to which the transmitted control information applies.

31. The radio node of claim 28:
wherein the control information comprises a trigger for aperiodic Channel Status Information (CSI) reporting; and
wherein the information field is a field associated with CSI reporting in the DCI message.

32. The radio node of claim 29:
wherein the instructions are such that the radio node is operative to receive or transmit feedback information on a decoding result for the CC of the respective one of the different groups of CCs on the primary component carrier or the secondary component carrier of the wireless device depending on whether the index offset, by which the CC of the respective one of the different groups of CCs to which the transmitted control information applies is identifiable, is an index offset of the primary component carrier or an index offset of the secondary component carrier.

33. The radio node of claim 29:
wherein the control information comprises scheduling information in form of a first resource assignment; and
wherein feedback information on a decoding result is indicated for the respective one of the different groups of CCs such that Acknowledged (ACK) indicates successful decoding on all of the CCs comprised in the respective one of the different groups of CCs and Non-acknowledged (NACK) indicates unsuccessful decoding on one or more of the CCs comprised in the respective one of the different groups of CCs.

34. The radio node of claim 33:
wherein the instructions are such that the radio node is operative to transmit the first resource assignment in a Downlink Control Information (DCI) message; and
wherein the respective one of the different groups of CCs is at least partly indicated by bits of a Carrier Information Field (CIF) in the DCI message.

35. The radio node of claim 33, wherein the first resource assignment applies equally to each one of the CCs comprised in the respective one of the different groups of CCs, such that a same amount of resources are comprised in respective sets of scheduled resources for the CCs comprised in the respective one of the different groups of CCs.

36. The radio node of claim 33:
wherein the first resource assignment applies to one or more, but less than all, of the CCs comprised in the respective one of the different groups of CCs; and
wherein a pre-configured set of scheduled resources applies for remaining CCs comprised in the respective one of the different groups of CCs.

37. The radio node of claim 36, wherein the instructions are such that the radio node is operative to select the pre-configured set of scheduled resources from a set of pre-configured sets of resources for scheduling.

38. The radio node of claim 33:
wherein the first resource assignment applies to one or more of the CCs comprised in the respective one of the different groups of CCs; and
wherein a second resource assignment applies to remaining CCs comprised in the respective one of the different groups of CCs.

39. The radio node of claim 38, wherein the first resource assignment is to be scaled to span the full bandwidth of the respective one of the different groups of CCs.

40. The radio node of claim 39, wherein the instructions are such that the radio node is operative to define one or more CC groups to be comprised in the respective different group of CCs.

41. A wireless device for communicating with a radio node in a wireless communication system, wherein the radio node is configured to apply cross-carrier scheduling, and the wireless device is configurable with at least two scheduling component carriers (CCs) available to the wireless communication system for communication with the wireless device, the wireless device comprising:
processing circuitry; and
memory containing instructions executable by the processing circuitry whereby the wireless device is operative to:

obtain information on an association of each one of the at least two scheduling CCs with a respective different group of CCs;

receive control information comprising scheduling information in a downlink control information message from the radio node wherein the control information is received on one of the scheduling CCs;

determine a CC of the respective one of the different groups of CCs based on a value of a carrier indicator field in the received control information and on the one of the scheduling CCs on which the control information is received; and apply the scheduling information in the received control information to the determined CC;

wherein the wireless device is configured with a relation between the scheduling CC upon which the control information is received and the respective one of the different groups of CCs;

wherein the instructions are such that the wireless device is operable to interpret the respective one of the different groups of CCs differently by applying an index offset that depends on the scheduling CC upon which the control information is received;

wherein the at least two scheduling CCs comprise a primary component carrier and a secondary component carrier of the wireless device; and wherein the index offset related to the primary component carrier differs from the index offset related to the secondary component carrier.

42. The wireless device of claim 41, wherein the instructions are such that the wireless device is operable to receive the control information in a Downlink Control Information (DCI) message and to identify the CC of the respective one of the different groups of CCs, to which the received control information applies, by applying the index offset to a value set by bits in an information field in the DCI message.

43. The wireless device of claim 42:
wherein the information field is a Carrier Information Field (CIF) in the DCI message.

44. The wireless device of claim 42:
wherein the control information comprises a trigger for Sounding Reference Signal (SRS) transmission; and
wherein the trigger indicates that SRS should be transmitted on the CC of the respective one of the different groups of CCs to which the received control information applies.

45. The wireless device of claim 42:
wherein the control information comprises a trigger for aperiodic Channel Status Information (CSI) reporting; and
wherein the information field is a field associated with CSI reporting in the DCI message.

46. The wireless device of claim 43:
wherein the instructions are such that the wireless device is operable to transmit or receive feedback information on a decoding result for the CC of the respective one of the different groups of CCs on the primary component carrier or the secondary component carrier of the wireless device depending on whether the index offset that is applied to identify the CC of the respective one of the different groups of CCs, to which the received control information applies, is an index offset of the primary component carrier or an index offset of the secondary component carrier.

47. The wireless device of claim 42:
wherein the control information comprises scheduling information in form of a first resource assignment; and
wherein feedback information on a decoding result is indicated for the respective one of the different groups of CCs such that Acknowledged (ACK) indicates successful decoding on all of the CCs comprised in the respective one of the different groups of CCs and Non-acknowledged (NACK) indicates unsuccessful decoding on one or more of the CCs comprised in the respective one of the different groups of CCs.

48. The wireless device of claim 47:
wherein the instructions are such that the wireless device is operable to receive the first resource assignment in a Downlink Control Information (DCI) message; and
wherein the respective one of the different groups of CCs is at least partly indicated by bits of a Carrier Information Field (CIF) in the DCI message.

49. The wireless device of claim 47, wherein the first resource assignment applies equally to each one of the CCs comprised in the respective one of the different groups of CCs, such that a same amount of resources are comprised in respective sets of scheduled resources for the CCs comprised in the respective one of the different groups of CCs.

50. The wireless device of claim 47:
wherein the first resource assignment applies to one or more, but less than all, of the CCs comprised in the respective one of the different groups of CCs; and
wherein a pre-configured set of scheduled resources applies for remaining CCs comprised in the respective one of the different groups of CCs.

51. The wireless device of claim 47:
wherein the first resource block assignment applies to one or more of the CCs comprised in the respective one of the different groups of CCs; and
wherein a second resource block assignment applies to remaining CCs comprised in the respective one of the different groups of CCs.

52. The wireless device of claim 51, wherein the wireless device is configured to scale the first resource assignment to span the full bandwidth of the respective one of the different groups of CCs.

* * * * *